(12) United States Patent
Kuester et al.

(10) Patent No.: US 10,223,651 B2
(45) Date of Patent: *Mar. 5, 2019

(54) COMPUTING DEPENDENT AND CONFLICTING CHANGES OF BUSINESS PROCESS MODELS

(75) Inventors: Jochen M. Kuester, Zurich (CH); Christian Gerth, Detmold (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 777 days.

This patent is subject to a terminal disclaimer.

(21) Appl. No.: 13/533,180

(22) Filed: Jun. 26, 2012

(65) Prior Publication Data

US 2012/0265582 A1 Oct. 18, 2012

Related U.S. Application Data

(62) Division of application No. 12/323,596, filed on Nov. 26, 2008, now Pat. No. 9,959,509.

(51) Int. Cl.
*G06Q 10/00* (2012.01)
*G06Q 10/10* (2012.01)
*G06Q 10/06* (2012.01)

(52) U.S. Cl.
CPC .......... *G06Q 10/06* (2013.01); *G06Q 10/067* (2013.01); *G06Q 10/06375* (2013.01)

(58) Field of Classification Search
CPC ............... G06Q 10/06375; G06Q 10/067
USPC ................... 705/1.1, 300–301, 348
See application file for complete search history.

(56) References Cited

U.S. PATENT DOCUMENTS

| 6,557,095 B1* | 4/2003 | Henstrom ............... 712/216 |
| 2003/0187670 A1 | 10/2003 | Hassinger et al. |
| 2005/0038764 A1* | 2/2005 | Minsky et al. ............ 706/47 |
| 2006/0020570 A1* | 1/2006 | Wu ........................... 707/1 |
| 2007/0006134 A1* | 1/2007 | Larvet et al. ............ 717/104 |
| 2007/0240111 A1* | 10/2007 | Britton et al. ........... 717/120 |

OTHER PUBLICATIONS

Shuang Sun, Akhil Kumar, John Yen, Merging workflows: A new perspective on connecting business processes, Decision Support Systems, vol. 42, Issue 2, Nov. 2006, pp. 844-858.*

* cited by examiner

*Primary Examiner* — Lynda Jasmin
*Assistant Examiner* — Maame Ofori-Awuah
(74) *Attorney, Agent, or Firm* — Cantor Colburn LLP; Daniel Morris

(57) ABSTRACT

Changing a business process model involves several aspects: (1) given a set of change operations, dependencies and conflicts are encoded in dependency and conflict matrices; (2) given a change sequence for a process model M, the change sequence is broken up into subsequences such that operations from different subsequences are independent; (3) given a change sequence for a process model V1 and another change sequence for a process model V2, conflicts between operations in the different change sequences are determined; (4) the process structure tree can be used to localize dependency computations, yielding a more efficient approach to determining dependencies; and (5) the process structure tree can be used to localize conflict computations, yielding a more efficient approach to determining conflicts.

15 Claims, 25 Drawing Sheets

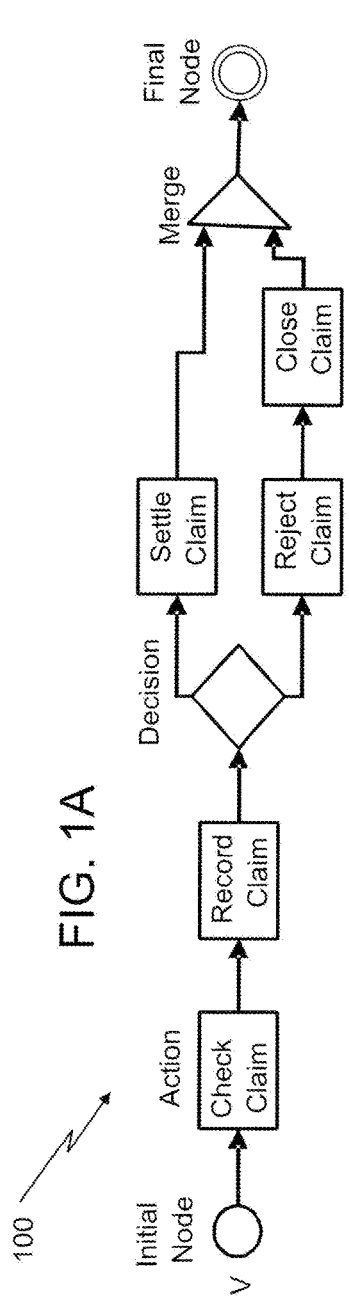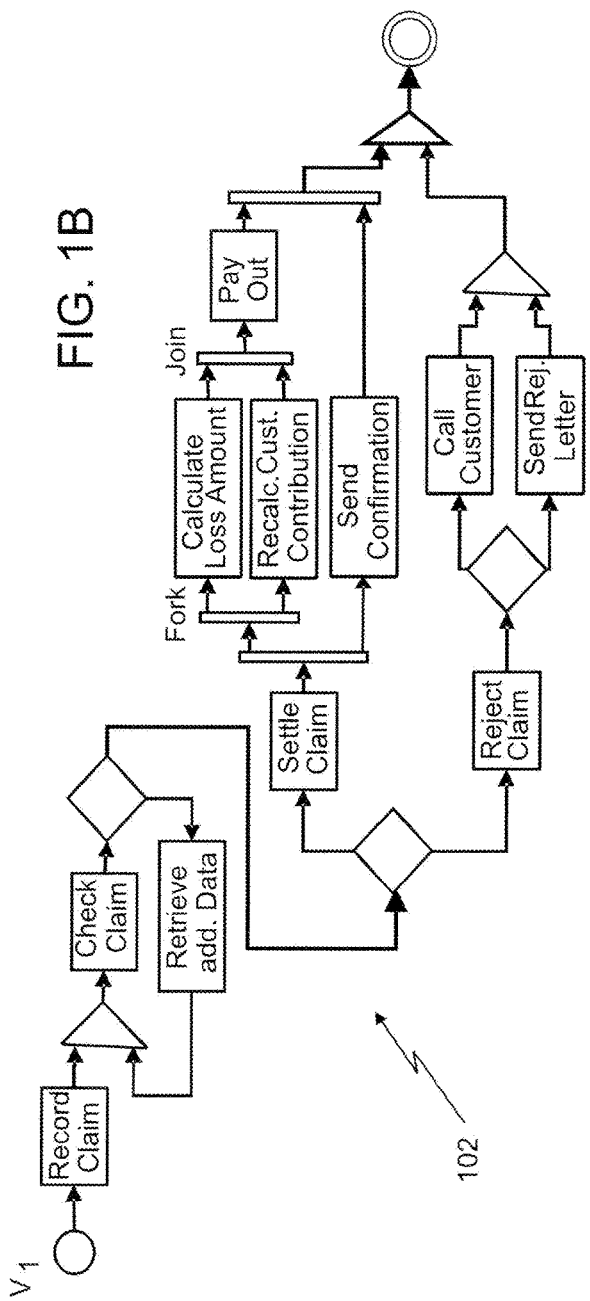

FIG. 2

$\Delta(V, V_1)$:                         200
< InsertAlt.Fragment($F_A$, "Reject Claim", "Close Claim"),
DeleteAction("Close Claim", $F_A$, $Merge^2$),
InsertCon.Fragment($F_{C1}$, "Settle Claim", $Merge^1$),
InsertAction("Pay Out", $Fork^1_{FC1}$, $Join^1_{FC1}$),
InsertAction("Send Conf.", $Fork^2_{FC1}$, $Join^2_{FC1}$),
InsertCyclicFragment($F_{Cy}$, "Record Claim", Decision),
MoveAction("Check Claim", InitialNode, "Record Claim", $Merge_{FCy}$, $Decision_{FCy}$),
InsertCon.Fragment($F_{C2}$, $Fork^1_{FC1}$, "Pay Out"),
InsertAction("Ret. add. Data", $Decision^2_{FCy}$, $Merge^2_{FCy}$),
InsertAction("Calc. Loss Amount", $Fork^1_{FC2}$, $Join^1_{FC2}$),
InsertAction("Call Customer", $Decision^1_{FA}$, $Merge^1_{FA}$),
InsertAction("Send. Rej. Letter", $Decision^2_{FA}$, $Merge^2_{FA}$),
InsertAction("Recalc. Cust. Contrib.", $Fork^2_{FC2}$, $Join^2_{FC2}$) >

$\Delta(V, V_2)$:                         202
< InsertCon.Fragment($F_{C3}$, "Reject Claim", "Close Claim"),
InsertCon.Fragment($F_{C4}$, "Settle Claim", $Merge^1$),
InsertCon.Fragment($F_{C5}$, $Fork^2_{FC4}$, $Join^2_{FC4}$),
InsertAction("Send Letter", $Fork^1_{FC4}$, $Join^1_{FC4}$),
InsertAction("Pay Out", $F_{C5}$, $Join^2_{FC4}$),
MoveAction("Check Claim", InitialNode, "Record Claim", "Record Claim", Decision),
InsertAction("Send Declinature", $Fork^1_{FC3}$, $Merge^1_{FC3}$),
InsertAction("Calc. Loss Amount", $Fork^1_{FC5}$, $Join^1_{FC5}$),
InsertAction("Update Cust. Record", $Fork^2_{FC3}$, $Join^2_{FC3}$),
InsertAction("Recalc. Cust. Contrib.", $Fork^2_{FC5}$, $Join^2_{FC5}$) >

| FIG. 5A | FIG. 5B |

| | InsertAction (X2,C,D) | DeleteAction (X2,C,D) | MoveAction (X2,oQ,oT,nQ,nT) | InsertFragment (F2,C,D) |
|---|---|---|---|---|
| InsertAction (X1,A,B) | [IA(X1), IA(X2)]: C=X1vD=X1 | [IA(X1), DA(X2)]: X2=X1v (D=X1 & X2=A)v (C=X1 & X2=B) | [IA(X1), MA(X2)]: (nQ=A&nT=X1)v (nQ=X1&nT=B)v (X2=A&nT=B)v (oQ=X1&X2=B)v (oQ=A&X2=X1&oT=B) | [IA(X1), IF(F2)]: C=X1v D=X1 |
| DeleteAction (X1,A,B) | [DA(X1), IA(X2)]: (C=A&D=B) | [DA(X1), DA(X2)]: (C=A & X2=B)v (X2=A&D=B) | [DA(X1), MA(X2)]: (nQ=A&nT=B)v (oQ=A&X2=B)v (X2=A&oT=B) | [DA(X1), IF(F2)]: (C=A&D=B) |
| MoveAction (X1,oP,oS, nP,nS) | [MA(X1), IA(X2)]: (C=oP&D=oS)v (C=X1&D=nS)v (c=nP&D=X1) | [MA(X1), DA(X2)]: (C=oP&X2=oS)v (X2=oP&D=oS)v (D=X1&X2=nP)v (C=X1&X2=nS)v (C=nP&X2=X1& D=nS) | [MA(X1), MA(X2)]: (nQ=oP&nT=oS)v (oQ=oP&X2=oS)v (nQ=oP&oT=oS)v (X2=oP&oT=oS)v (oQ=X1&nT=nS)v (X2=X1&nT=nS)v (oQ=X1&X2=nS)v (X2=X1&nT=X1)v (nQ=nP&nT=X1)v (nQ=nP&X2=X1)v (oQ=nP&X2=X1) | [MA(X1), IF(F2)]: (C=oP&D=oS)v (C=X1&D=nS)v (C=nP&D=X1) |
| Insert Fragment (F1,A,B) | [IF(F1), IA(X2)]: C=F1vD=F1v C=entry(F1)v D=exit(F1) | [IF(F1), DA(X2)]: X2=A&D=F1)v (C=F1 &X2=B)v C=entry(F1)v D=exit(F1) | [IF(F1), MA(X1)]: (nQ=A & nT=F1)v (nQ=F1 & nT = B)v (X2=A & oT = B)v (oQ = F1 &X2 = B)v oQ=entry(F1)v nQ=entry(F1)v oT=exit(F1)v nT=exit(F1) | [IF(F1), IF(F2)]: C=F1vD=F1v C=entry(F1)v D=exit(F1) |

| | InsertAction (X2,C,D) | DeleteAction (X2,C,D) | MoveAction (X2,oQ,oT,nQ,nT) | InsertFragment (F2,C,D) |
|---|---|---|---|---|
| InsertAction (X1,A,B) | (C=A&D=B) | (C=A & X2=B)∨ (X2 =A&D=B) | (nQ=A&nT=B)∨ (X2=A&oT=B)∨ (oQ=A&X2=B) | (C=A&D=B) |
| DeleteAction (X1,A,B) | (C=A&D=X1)∨ (C=X1&D=B) | (X2=A&D=X1)∨ (C=X1 & X2=D)∨ (C=A&X2=X1 & D=B)∨ | (X2=A&oT=X1)∨ (oQ=X1 & X2=B)∨ (nQ=A&nT=X1)∨ (nQ=X1&nT=B)∨ (oQ=A&X2=X1& oT=B) | (C=A&D=X1)∨ (C=X1&D=B) |
| MoveAction (X1,oP,oS, nP,nS) | (C=nP&D=oP)∨ (C=X1&D=oS)∨ (C=oP&D=X1) | (X2=oP&D=X1)∨ (C=X1&X2=oS)∨ (C=nP&X2=nS)∨ (X2=nP&D=nS)∨ (C=oP&X2=X1& D=oS) | (nQ=nP& nT=nS)∨ (nQ=X1&nT=oS)∨ (nQ=oP&nT=X1)∨ (oQ=nP&X2=nS)∨ (oQ=X1&X2=oS)∨ (oQ=oP&X2=X1)∨ (X2=nP&oT=nS)∨ (X2=X1&oT=oS)∨ (X2=oP&oT=X1) | (C=nP&D=oP)∨ (C=X1&D=oS)∨ (C=oP&D=X1) |
| Insert Fragment (F1,A,B) | (C=A & D=B) | (C=A & X2=B)∨ (X2=A& D=B) | (nQ=A&nT=B)∨ (X2=A&oT=B)∨ (oQ=A&X2=B) | (C=A & D=B) |

FIG. 7

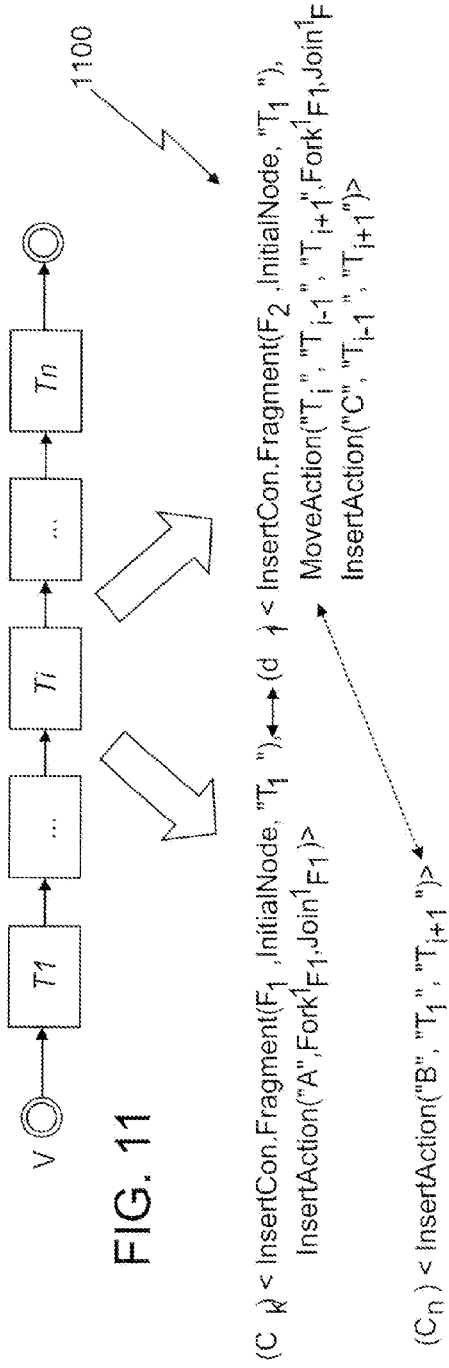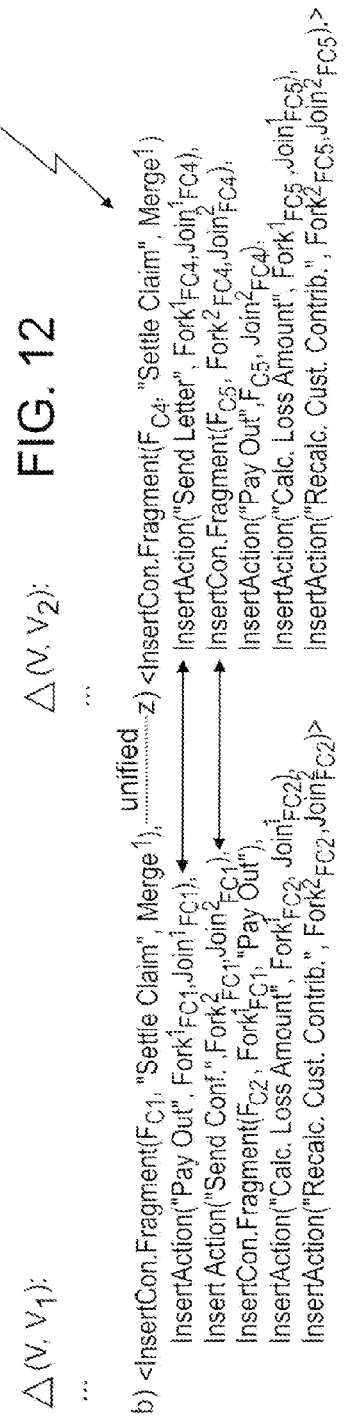
FIG. 11
FIG. 12

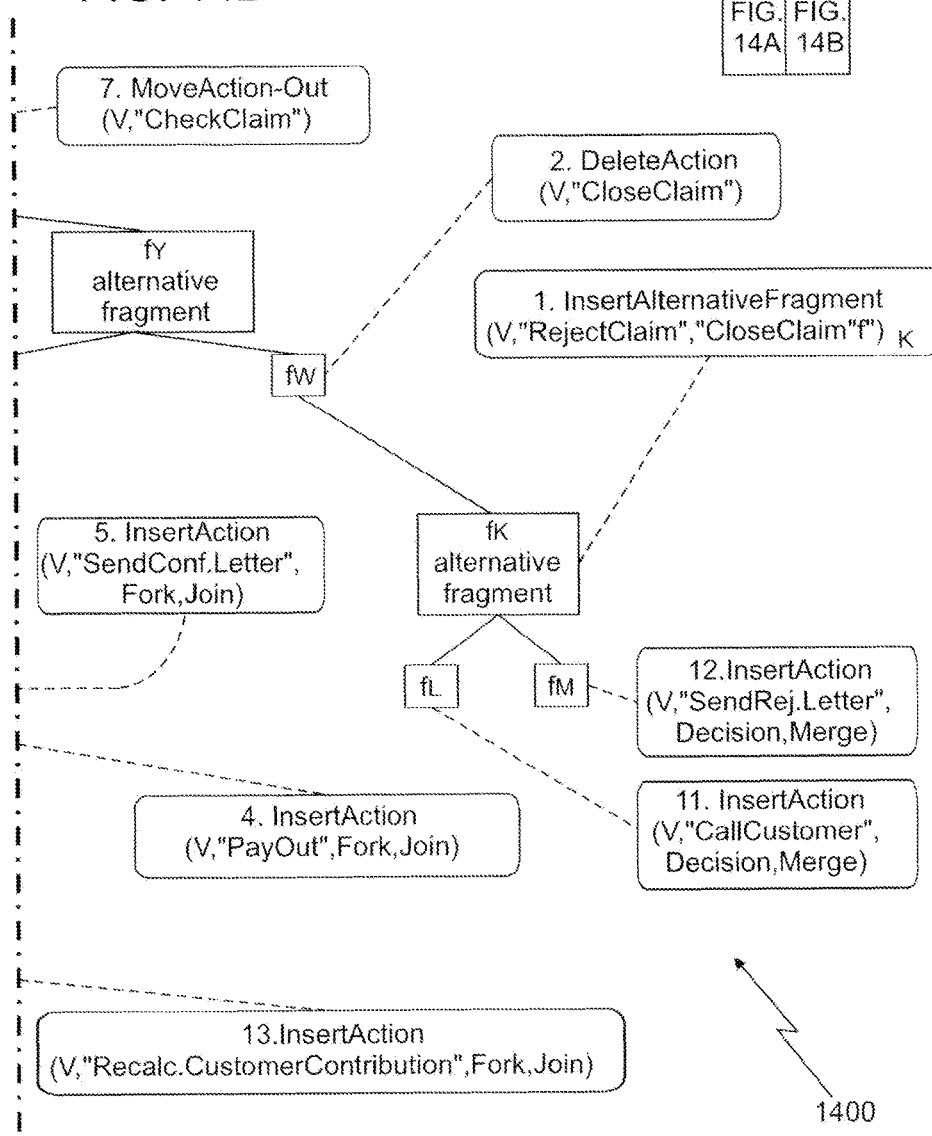

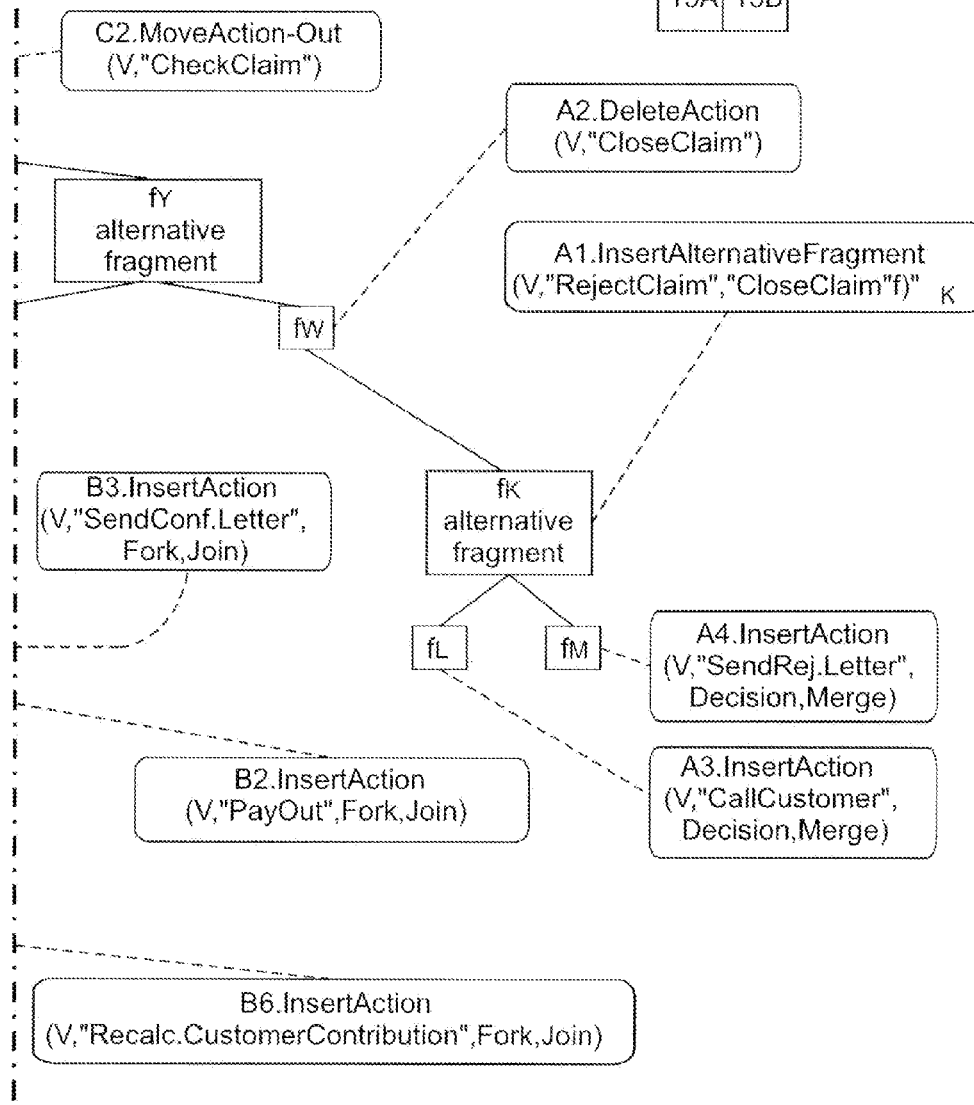

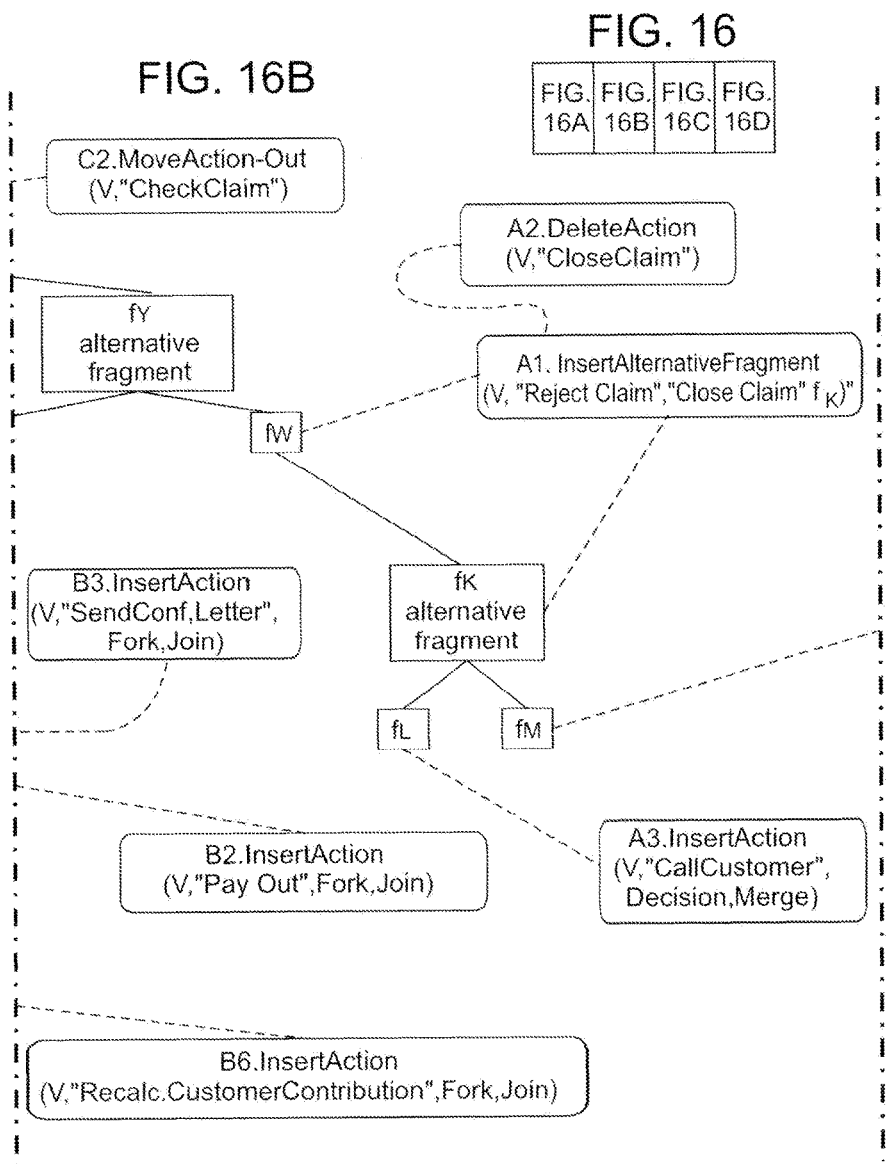

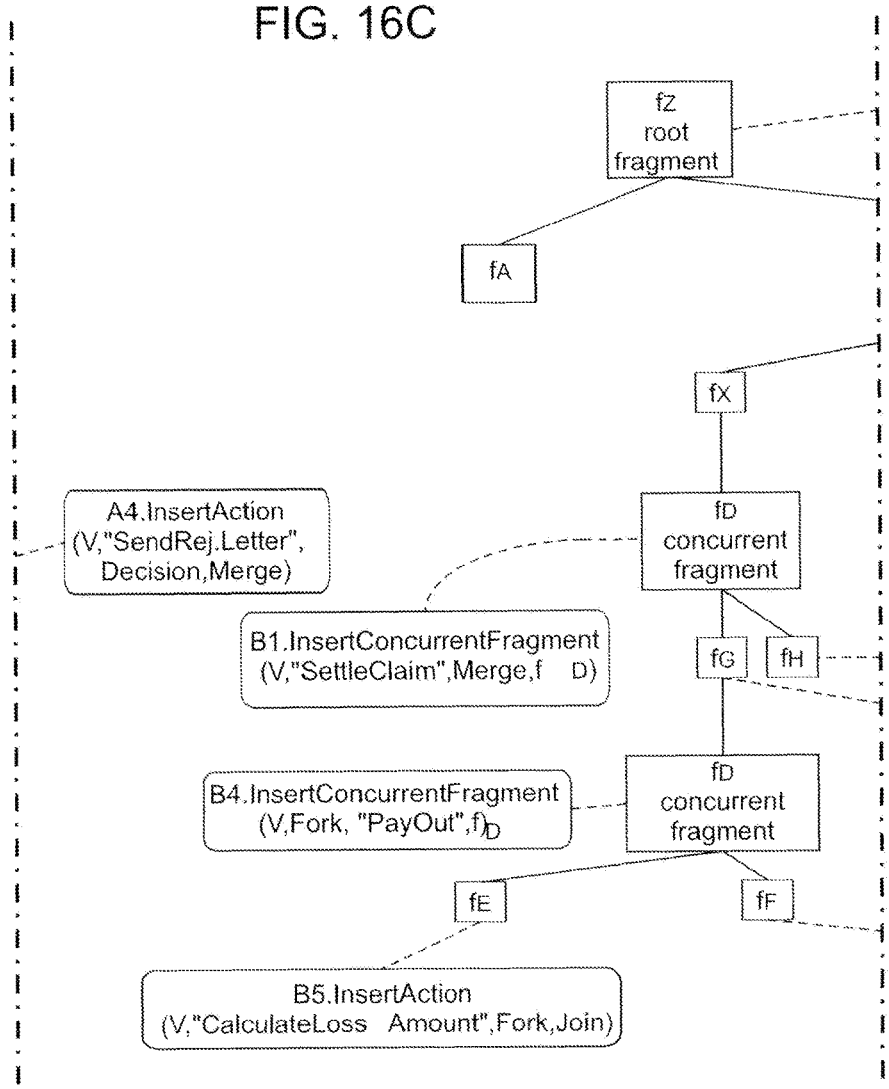

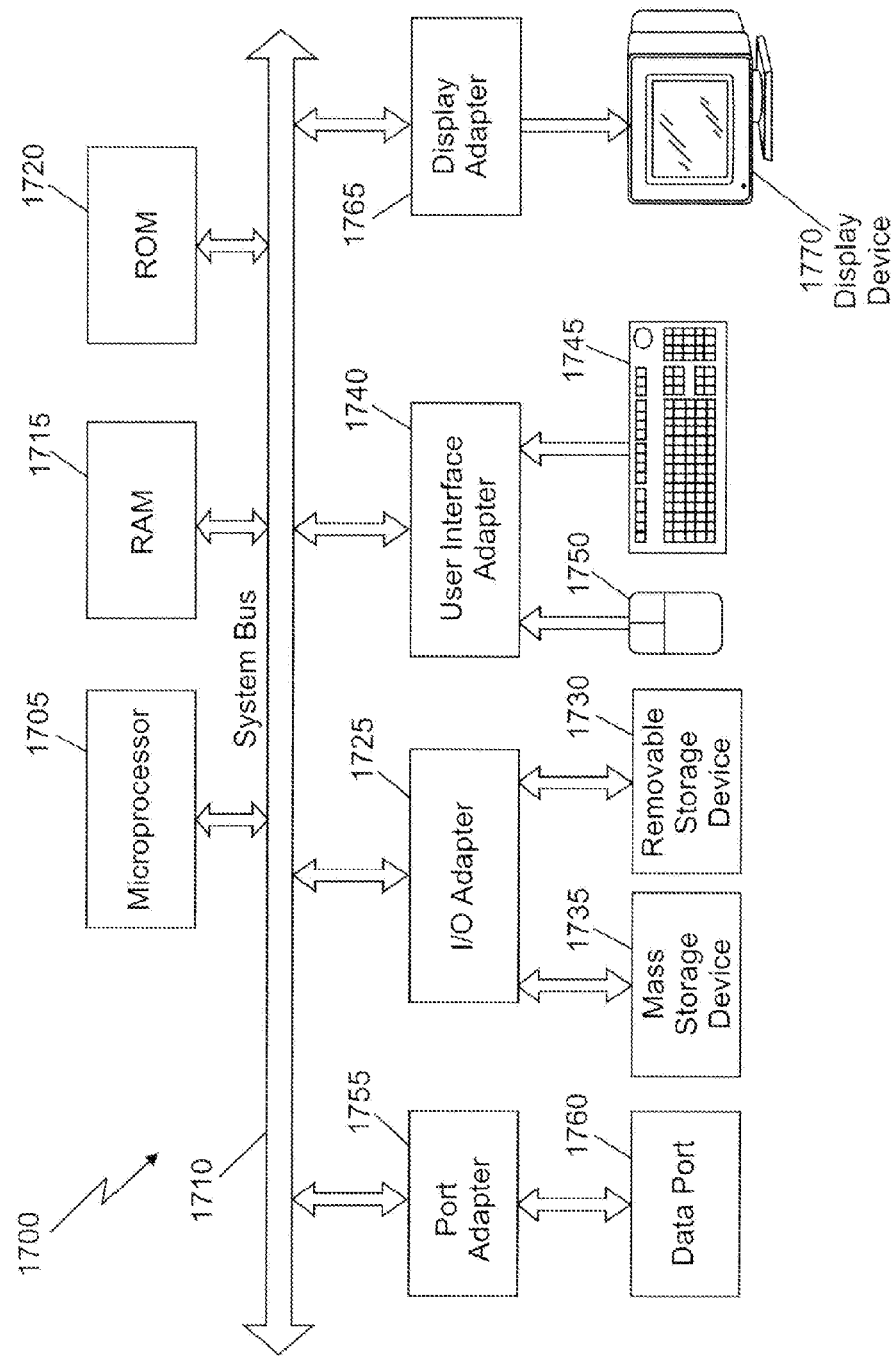

COMPUTING DEPENDENT AND CONFLICTING CHANGES OF BUSINESS PROCESS MODELS

CROSS-REFERENCE TO RELATED APPLICATION

This application is a divisional of U.S. patent application Ser. No. 12/323,596, filed Nov. 26, 2008, the disclosure of which is incorporated by reference herein in its entirety.

BACKGROUND

The present invention relates to process models, and, more specifically, to changes of business process models.

Business transformation deals with the strategic alignment of business and information technology (IT) to deliver enduring on-demand value of continual business innovation and improvement. Business transformation comprises three main challenges: (1) analysis and modeling of business strategy and operations to drive business transformation; (2) efficient generation of an IT solution from a business model using techniques from Model-Driven Development (MDD) of software systems; and (3) monitoring and dynamic management of business performance for continual improvement.

When dealing with business process models, one often gets into a process merging scenario where two or more process models have to be brought together in order to create an improved business process. One scenario for process merging is the improvement of an existing process model (AS-IS model) by a reference model where some parts of the existing model are preserved and others are replaced. Process merging is also required when companies become subject to acquisitions and mergers. In such situations, processes need to be aligned at the business and IT level. However, differences also have to be identified and preserved, if appropriate. A third scenario arises if two or more different versions of the same process model need to be integrated.

Existing solutions and tools do not offer support for iterative merging of business process models. In particular, they do not deal with the problem of process merging in the situation where two versions of a process model are derived from a common source model and these two versions have to be consolidated. In such a scenario, conflicts and dependencies between change operations need to be computed, visualized and resolved.

Further, version management of models is important for enabling modeling in distributed modeling scenarios. In general, it requires the computing and visualizing of changes that have been performed on a common source model while creating different versions. Based on this, version management capabilities then have to enable the user to create a consolidated model, by accepting or rejecting changes and thereby modifying the original source model.

A requirement for consolidation of changed models is that it should impose minimal manual overhead on the user. Otherwise, a straightforward solution is that the user remodels all changes manually. Nowadays, version management is a common functionality of mainstream modeling tools such as the IBM Rational Software Architect. However, for behavioral models such as process models, inspecting and accepting or rejecting changes can involve relatively large overhead if the changes to be dealt with are numerous. One reason for this is that the semantics of behavioral models are usually more complex than for structural models. A straightforward approach to compute all changes on model elements (called elementary changes) and display them is difficult to handle for the user. Typically, elementary changes cannot be considered in isolation but must be aggregated to compound changes.

Informally, if two changes are dependent, then the second one requires the application of the first one. If two changes are in conflict, then only one of the two can be applied. Other than in structural models, in behavioral models changes are often dependent on one another. As a consequence, an approach for computing dependent and conflicting changes is required. Further, once conflicts have been computed, techniques for resolving conflicts are needed that take into account the characteristics of the modeling language. For example, conflicts in process models are resolved differently from conflicts in state chart diagrams.

BRIEF SUMMARY

According to an embodiment of the invention, a method for changing a business process model includes specifying any change operations to the business process model, and utilizing a joint process structure tree to localize dependencies between any of the change operations. Also, a method for changing a business process model includes specifying any change operations to the business process model, and utilizing a joint process structure tree to localize conflicts between any of the change operations.

According to another embodiment of the invention, a method for changing a business process model includes specifying any change operations to the business process model. The method further includes deriving a dependency matrix from the specified change operations to the business process model, and determining any independent subsequences from the specified change operations to the business process model, wherein if all of the specified change operations are independent then the specified change operations can be executed in any order and wherein if none of the specified change operations are independent then all of the specified change operations are executed in a sequence of the specified change operations.

According to yet another embodiment of the invention, a method for changing a business process model includes specifying any change operations to the business process model. The method further includes deriving a conflict matrix from the specified change operations to the business process model, and determining any independent subsequences from the specified change operations to the business process model, wherein if all of the specified change operations are independent then the specified change operations can be executed in any order and wherein if none of the specified change operations are independent then all of the specified change operations are executed in a sequence of the specified change operations. The method also includes determining conflicting change sequences from the specified change operations to the business process model, wherein if any conflicting change sequences are determined then the conflicting change sequences are presented for resolution.

According to still another embodiment of the invention, a method for changing a business process model includes specifying any change operations to the business process model. The method further includes deriving a dependency matrix from the specified change operations to the business process model, deriving a conflict matrix from the specified change operations to the business process model. The method also includes determining any independent subsequences from the specified change operations to the business process model, wherein if all of the specified change operations are independent then the specified change operations can be executed in any order and wherein if none of the specified change operations are independent then all of the specified change operations are executed in a sequence of the specified change operations, and determining conflicting change sequences from the specified change operations to the business process model, wherein if any conflicting change sequences are determined then the conflicting change sequences are presented for resolution.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features and advantages of the invention are apparent from the following detailed description in conjunction with the accompanying drawings in which:

FIG. 2 illustrates two change logs that contain the changes to the business process model of FIG. 1 to obtain two alternative, changed business process models;

FIG. 6 illustrates a dependency matrix derived for the change operations of FIG. 2;

FIG. 7 illustrates the conflict matrix derived for the change operations of FIG. 2;

FIG. 8, including

FIG. 11 illustrates an example of conflicts arising due to conflict resolution;

FIG. 12 illustrates a conflict between subsequences that is likely to be resolved by a unification;

FIG. 17 is a schematic block diagram of a general-purpose computer suitable for practicing embodiments of the present invention.

DETAILED DESCRIPTION

Business process models may be manipulated in a distributed manner by several modelers, in a similar manner as UML models for software modeling or in a similar manner in which Java source code can be worked on simultaneously by different people. In such cases, changes made in different models are consolidated at some point and an integrated consolidated process model is created. For creating such an integrated process model, differences are analyzed and parts of different versions are merged into the integrated process model.

One scenario for process model merging arises if two process models are derived from a common source process model and are to be integrated into a common process model. In such a scenario, dependencies between changes performed on the same process model as well as conflicts between changes performed on different process models have to be computed, visualized and resolved.

Figure 1C:
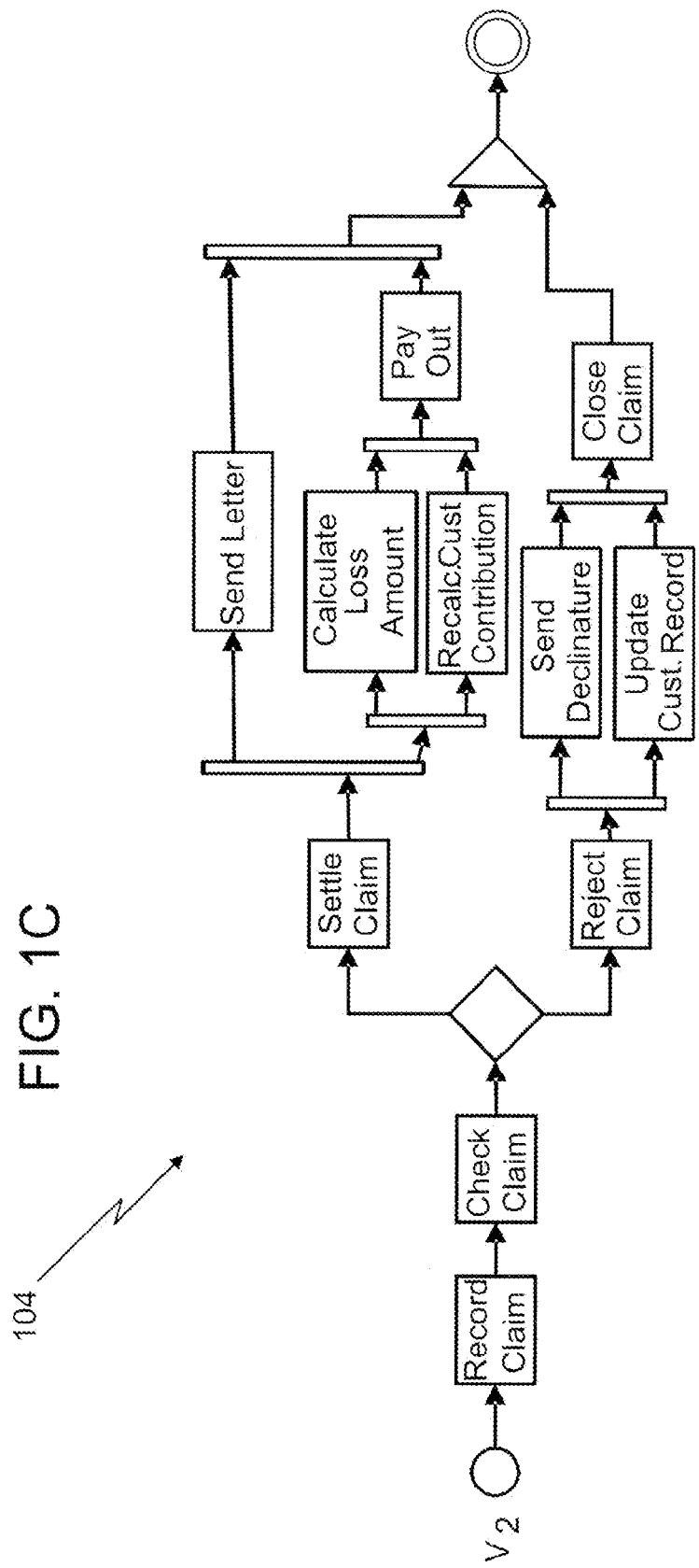
FIG. 1 illustrates an example of a business process model along with two changed versions of that model.

FIG. 1 provides an example for such a scenario illustrating a source process model V 100 and two process models V1 102 and V2 104 both derived from the source process model V 100. As a prerequisite, it is assumed that the change sequences for determining or computing V1 102 from V 100 and for determining or computing V2 104 from V 100 are both available. The source business process model V 100 in FIG. 1 is an example from the insurance domain. Various nodes within the models 100-104 can be Actions or ControNodes, where ControNodes contain Decision and Merge, Fork and Join, InitialNodes and FinalNodes. Nodes are connected by control flow diagrams as known from UML Activity Diagrams. In the exemplary model V 100 in FIG. 1, an insurance claim is first checked and recorded, and then a decision is made whether to settle or reject the claim.

In a distributed modeling scenario, the source process model V 100 may have been created by the process model representative in an enterprise and then given to two colleagues for further elaboration. During this elaboration period, one colleague creates the model V1 102, and the other colleague creates the model V2 104. Afterwards, the process model representative is faced with the task of inspecting each change and then either accepting or rejecting the change.

A common approach for version management of models is to capture possible operations performed on the model. For behavioral models such as process models, it is possible to design compound change operations that transform a model from one consistent state into a new consistent state. As such, compound change operations for process models may comprise InsertAction, DeleteAction, or MoveAction operations which allow one to insert, delete or modify, respectively, actions and always produce a connected process model as output. Each of the operations comprises several elementary changes such as creating a new action and redirecting source and targets of the edges. Similarly, InsertFragment, DeleteFragment and MoveFragment operations can be used for inserting, deleting or moving, respectively, a complete fragment of the process model. Here, a fragment can either be an alternative fragment comprising a Decision and a Merge node, a concurrent fragment comprising a Fork and a Join node, or further types of fragments including unstructured or complex fragments which allow one to express all combinations of control nodes.

The appropriate change sequences between the models V 100 and V1 102, and between V 100 and V2 104 are shown in the change logs 200, 202 of FIG. 2, which record each sequence of change operations. The change logs 200, 202 each describe the change operations performed on the source model V 100 to obtain the target model V1 102, V2 104, and can either be logged during editing or reconstructed by comparing the source and target models. It is assumed that the change logs 200, 202 are "clean" in that they do not contain unnecessary change operations that are later overridden in the change log. Typically, newly introduced action nodes that are supposed to be identical in different versions are captured by a mapping of identical actions.

FIG. 2 illustrates the two change logs. The change log Δ (V, V1) 200 describes the sequence of change operations for obtaining V1 102 from V 100, and the change log Δ (V, V2) 202 describes the sequence of change operations for obtaining V2 104 from V 100. For example, InsertAlt.Fragment ($F_A$, "Reject Claim", "Close Claim") introduces a new alternative fragment called $F_A$ between the nodes "Reject Claim" and "Close Claim". Two scenarios are distinguished: in the single user scenario, a sequence of change operations is performed on the model V 100, obtaining the model V1 102. Afterwards, this sequence of change operations is displayed to the user and for each change the user either has to confirm or reject the change. In the multi-user scenario, two sequences of change operations are performed concurrently on V 100, leading to V1 102 and V2 104. Afterwards, all change operations are reconsidered and either rejected or confirmed.

Requirements for both scenarios are that the application of changes are automatic and involve minimal user interaction. This requires the change operations to be executed automatically and requires the validity of their parameters. If the parameters are invalid then a change operation becomes non-applicable. For this purpose, it is important that dependencies between change operations in the change sequences are known. The rejection of one operation can turn other operations non-applicable. For example, the rejection of an InsertAlt.Fragment operation leads to the non-applicability of all operations operating on this fragment. In addition, in the multi-user scenario, conflicts need to be identified because it is impossible to apply both operations that are in conflict without adaptation. For example, InsertAlt.Fragment ($F_A$, "Reject Claim", "Close Claim") and InsertCon.Fragment ($F_{C3}$, "Reject Claim", "Close Claim") are in conflict because either an alternative or a concurrent fragment is inserted at the same position. This means that once one of the change operations has been chosen the other one becomes non-applicable.

Figure 3:
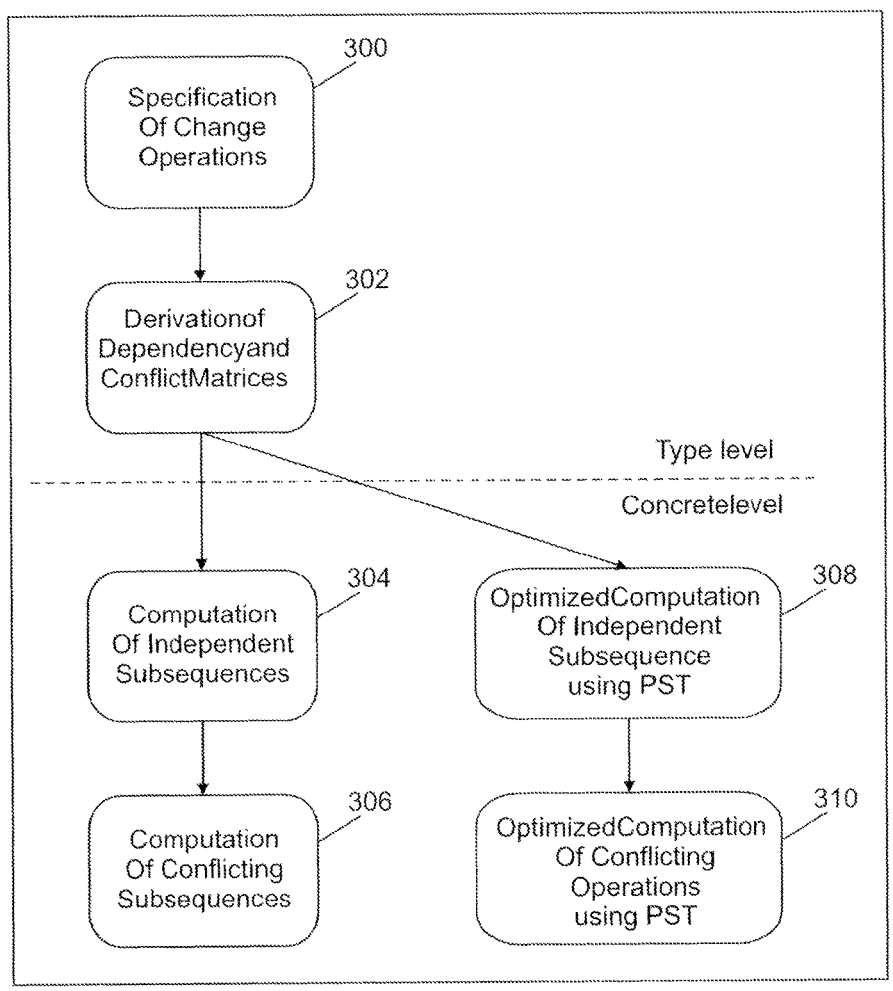
FIG. 3 illustrates a high-level overview of the activities within a method according to an embodiment of the invention.

FIG. 3 illustrates a high-level overview of the activities contained in a method according to an embodiment of the invention. First, change operations are formally specified in a block 300 and then this specification is used for deriving dependency and conflict matrices in a block 302. In alternative embodiments, only a dependency matrix or only a conflict matrix may be derived. These two activities are performed on the type level, i.e., independent of particular change sequences. Then, given particular change sequences as described in FIG. 2, two alternative ways of determining or computing independent subsequences and conflicting operations and subsequences are provided on the concrete level. That is, determination or computation of independent subsequences is performed in a block 304 and determination or computation of conflicting subsequences is performed in a block 306. Also, optimized determination or computation of independent subsequences using a process structure tree (PST) is performed in a block 308, and optimized determination or computation of conflicting operations using a PST is performed in a block 310.

An initial step in a method according to an embodiment of the invention is to specify all possible change operations and their effect on the underlying model using a rewriting technique such as graph transformation. For achieving this, first a metamodel for the process modeling language is defined. Then each operation is specified over this metamodel as a transformation rule. For each operation, the parameters must be specified that determine the effect of the operation. As an example, consider the change operation InsertAction that inserts an action between two other actions and reconnects the control flow. This operation is given the parameters InsertAction(x,a,b), where x is the action to be inserted, and a and b are the nodes between which x is inserted.

Figure 4:
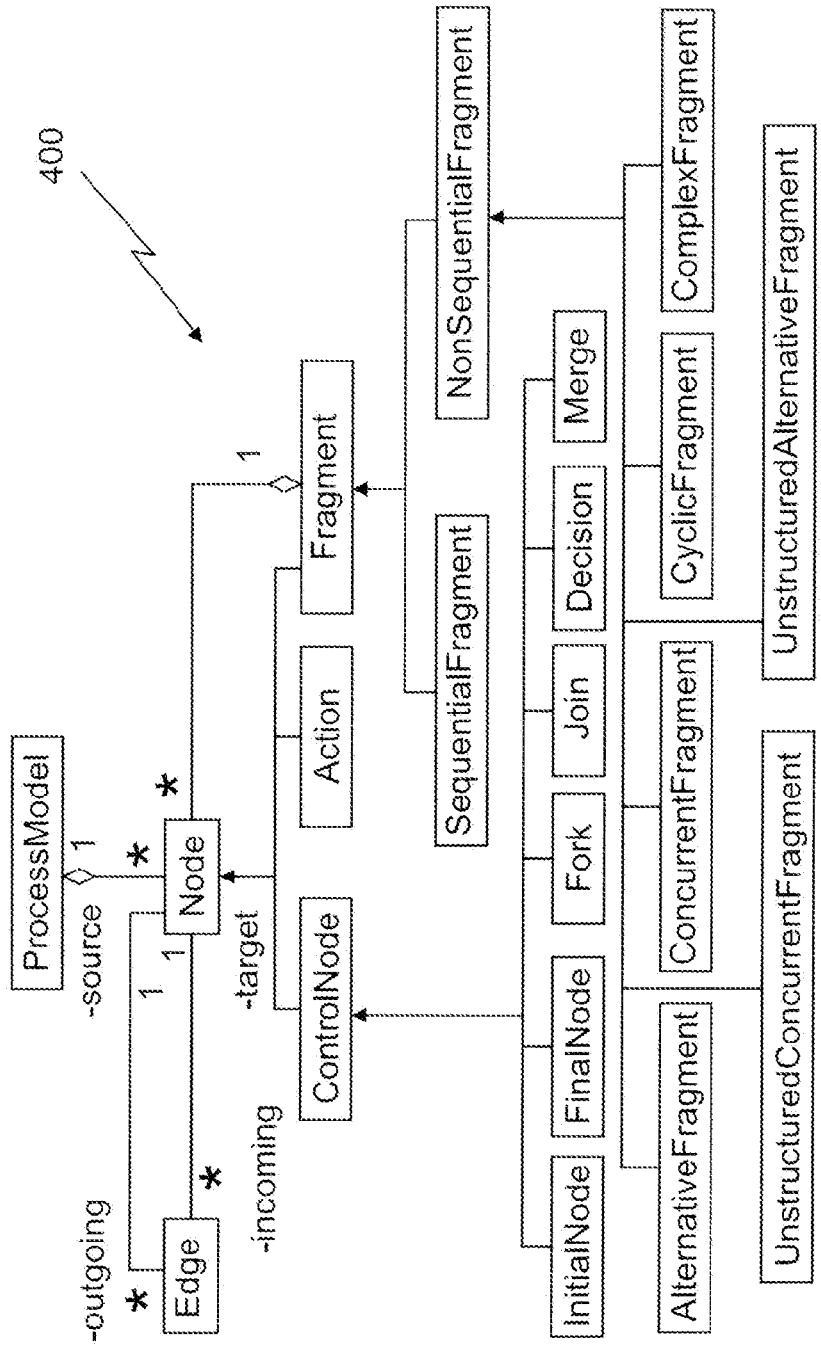
FIG. 4 illustrates a simplified metamodel of a business process model.

In the following, the change operations are formalized over a process model metamodel as previously performed for other model transformation rules. A business process model is defined by the simplified metamodel 400 shown in FIG. 4 comprising nodes connected by edges. Nodes can be Actions or ControNodes or Fragments. ControNodes contain Decision and Merge, Fork and Join, Initiallodes and FinalNodes. The metamodel 400 is restricted by constraints and, in particular, for Actions only at most one incoming and outgoing edge is allowed. Fragments are an extension that allows the representation of a decomposition of the process model that can be computed using existing algorithms. Fragments can be used for various analysis purposes such as control and data flow analysis but are also beneficial in the context of version management because they allow one to detect and specify compound changes.

Each change operation c on a model V can be viewed as a model transformation rule that can be formalized as a typed attributed graph transformation rule where the type graph represents the metamodel. A typed graph transformation rule p: L →R comprises a pair of typed instance graphs L, R such that the union is defined. A graph transformation step from a graph G to a graph H, G⇒ H, is given by a graph homomorphism o: L U R→G U H, called occurrence, such that the left hand side is embedded into G and the right hand side is embedded into H and precisely that part of G is deleted which is matched by elements of L not belonging to R, and, that part of H is added which is matched by elements new in R. For a rule p, an inverse rule $p^{-1}$ can be constructed that inverts the transformation defined by p.

Figures 5, 5A:
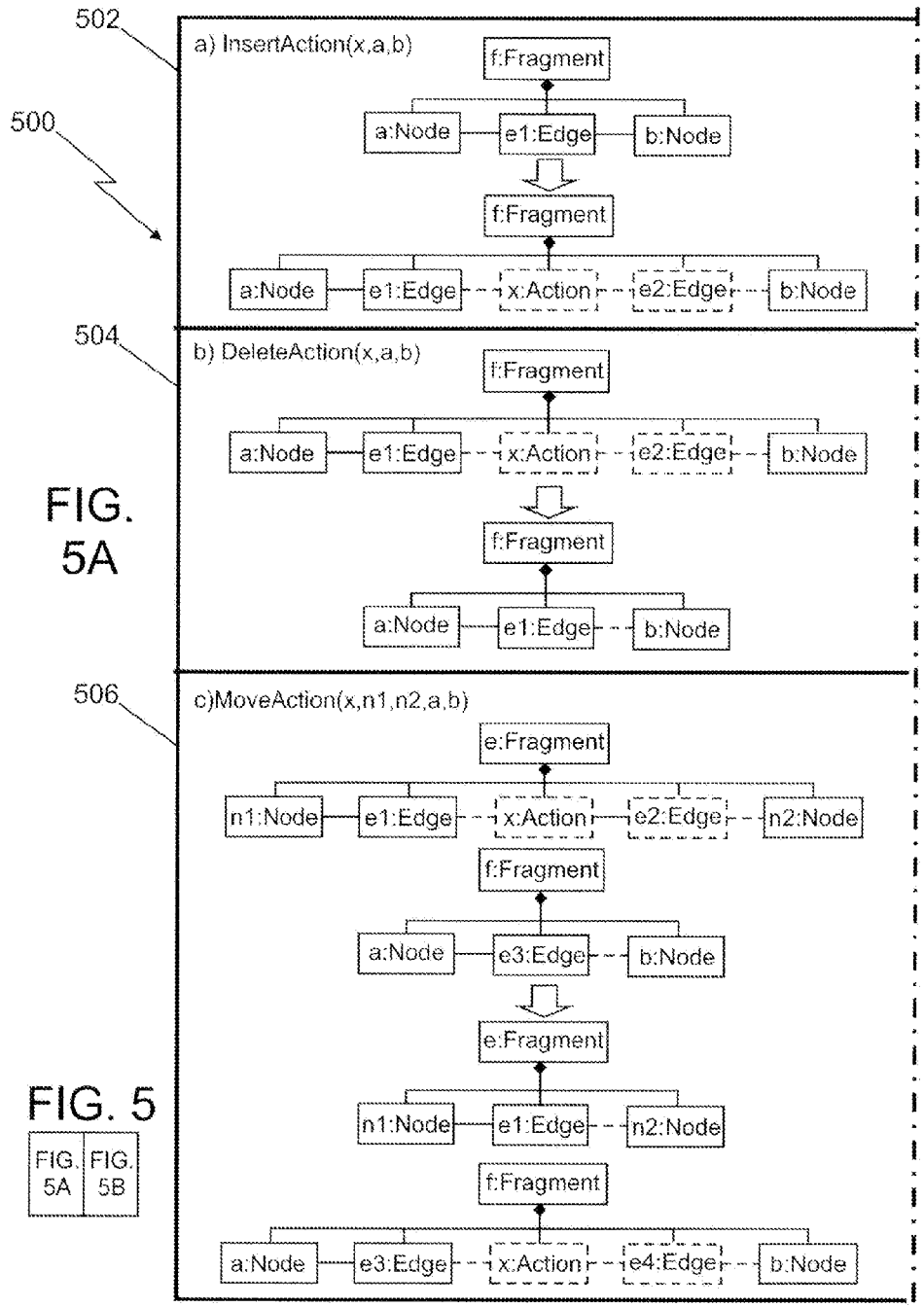
FIG. 5 illustrates various graph transformation rules relating to the change operations of FIG. 2.
Figure 5B:
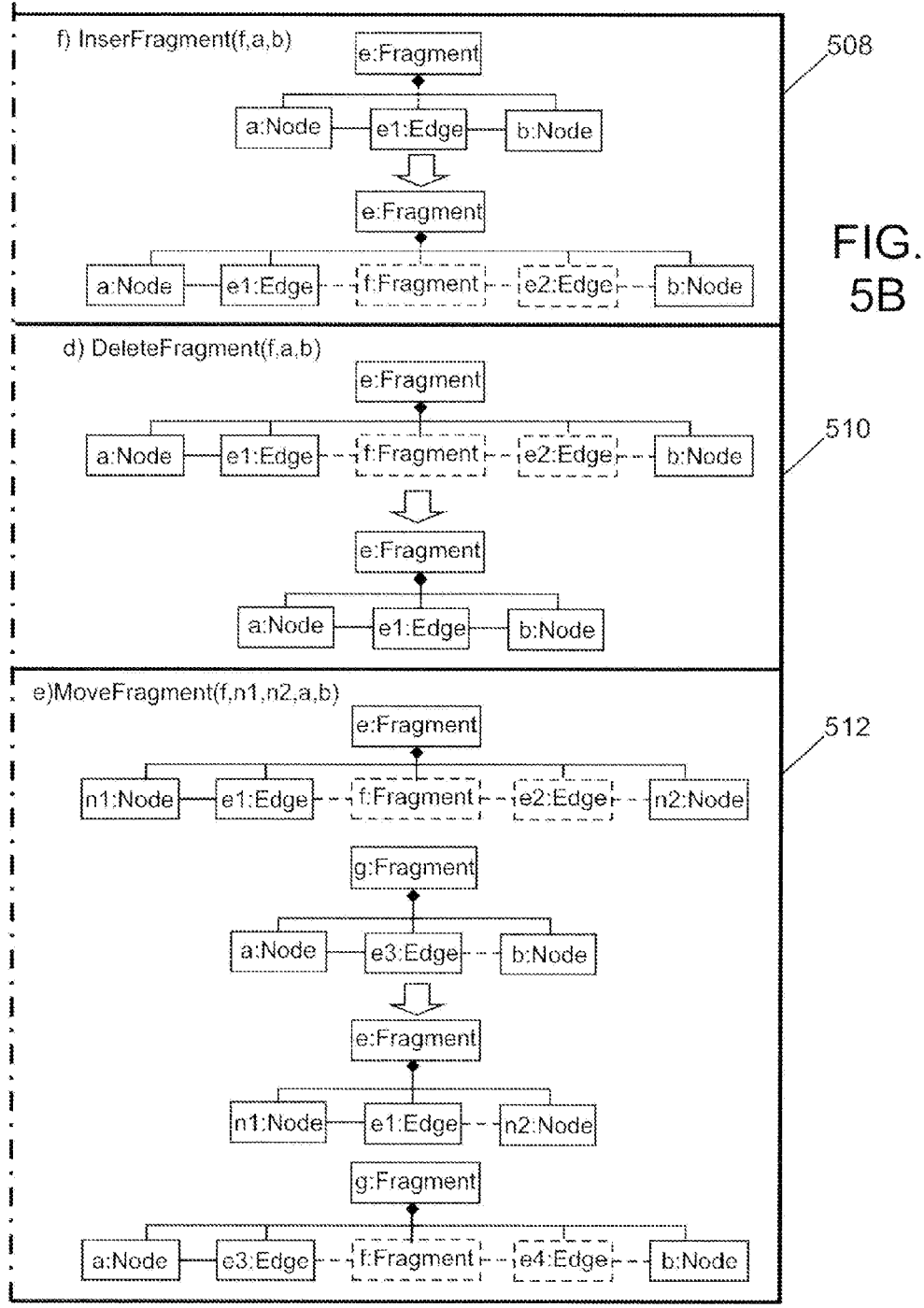

The change operations of FIG. 2 are specified as various graph transformation rules 500 in FIG. 5. A transformation rule shows how the new action is inserted into the model. As mentioned, the InsertAction operation 502 inserts a new Action between two existing nodes and also reconnects the process model such that it stays connected. For this purpose and as an example, in the operation 502 the left hand side of the rule matches a fragment f and two nodes a and b connected by an edge e1. It then creates a new Action x and a new edge e2 and redirects the target of the edge e1 to be the new Action. In a similar way, DeleteAction 504 and MoveAction 506 delete an action or move an action, respectively. Fragment operations 508-512 are used for inserting, deleting or moving a fragment of the process model. Note that fragments can be concurrent fragments, alternative fragments, or other types.

Type-level dependencies and/or conflicts between change operations can be determined or computed. The result is for each combination of operations a number of overlapping graphs (so-called critical pairs). In the method of an embodiment of the invention, each such critical pair is examined and the conditions for the existence are expressed in terms of the operation parameters. This leads to the creation of two matrices: a dependency matrix and a conflict matrix. In a first step, a dependency matrix is derived for the change operations and each potential dependency is expressed in terms of the operation parameters fixed earlier. In a second step, a conflict matrix may be derived for the change operations and each potential conflict is expressed in terms of the operation parameters fixed earlier. FIG. 6 illustrates a dependency matrix 600 derived for the change operations of FIG. 2. Each entry of the matrix 600 encodes when the two operations are dependent. FIG. 7 illustrates the conflict matrix 700 derived for the change operations of FIG. 2. Using this conflict matrix 700 the conflicts of change operations can be computed in different subsequences. This yields a precise view of which change sequences can be independently committed and which sequences cannot.

More specifically, for graph transformation dependencies and conflicts have been defined. If two graph transformations are mutually independent, they can be applied in any order yielding the same result, which is referred to as parallel independence. Otherwise, if one of the two alternative transformations is not independent of the second, the second will disable the first. In this case, the two steps are in conflict. Parallel independence of two transformation steps induces their sequential independence and vice versa with adapted occurrences.

Figure 8A:
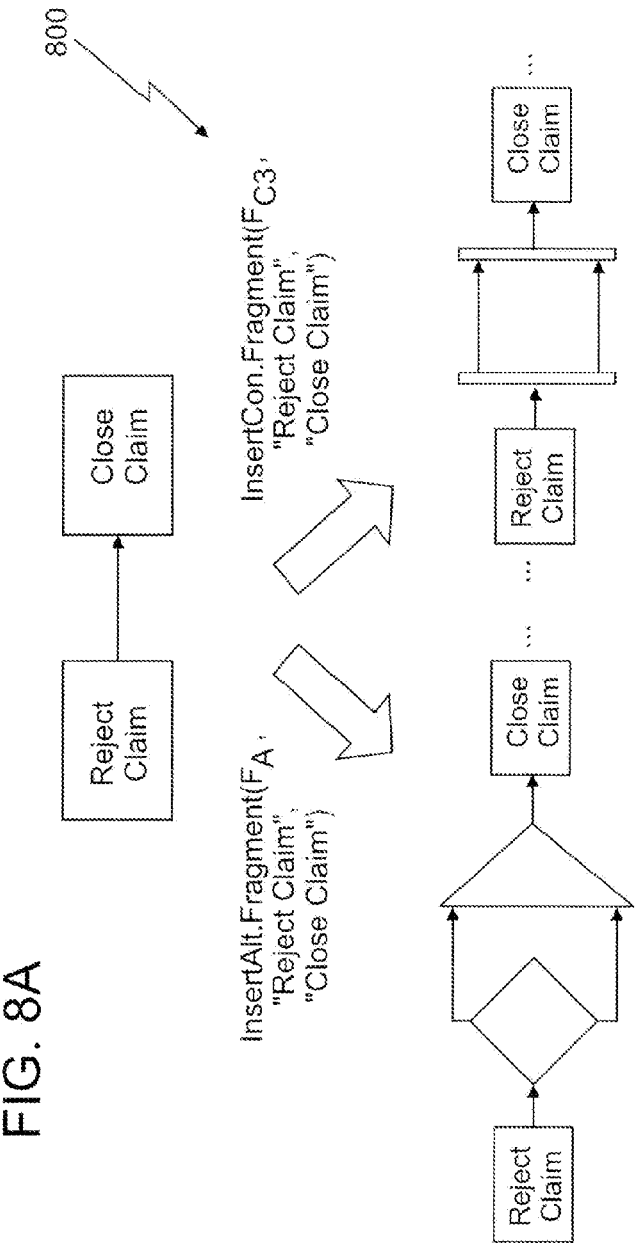
FIGS. 8A and 8B, illustrates two conflicting changes in concrete syntax (8A) and abstract syntax (8B), respectively, and illustrates the critical pair for this situation.
Figure 8B:
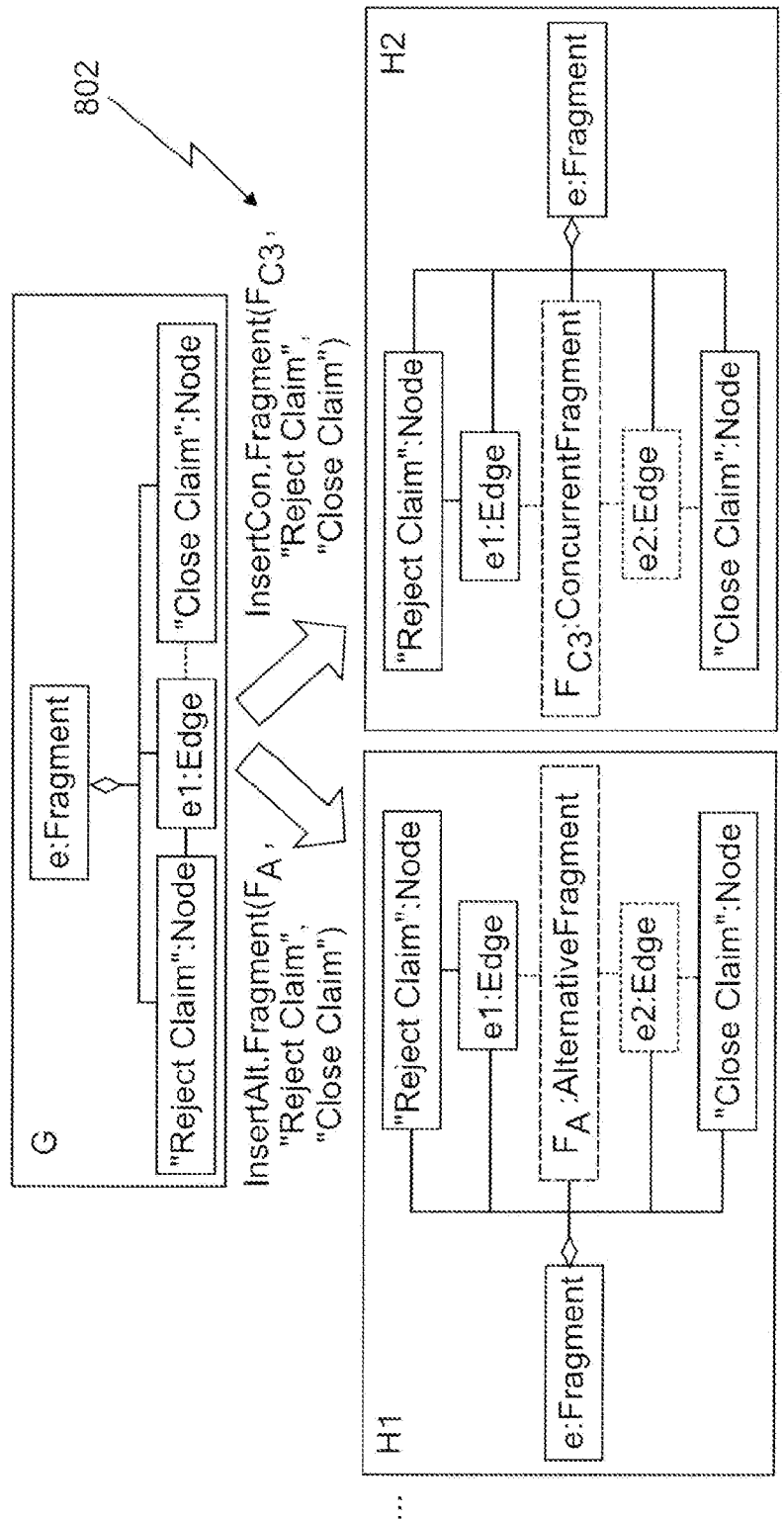

Often, it is desirable to know not only whether two particular transformation steps are parallel or sequentially independent, but also whether two transformation rules are parallel or sequentially independent. Given two rules, a potential conflict or dependency occurs if there exist transformation steps such that a conflict or sequential dependency occurs. Given two rules, the computation of potential conflicts and dependencies can be performed using critical pairs. A critical pair is a pair of transformation steps that are in conflict with the property that it is minimal. Critical pairs of two rules can be computed by overlapping the left hand sides of the two rules in all possible ways such that there exists at least one object that is deleted by one of the rules and both rules are applicable. FIG. 8A illustrates two conflicting changes 800 in concrete syntax from this example, while FIG. 8B illustrates the critical pair 802 for this situation. Here, both changes insert a fragment at the same position in G. If one of the changes is applied, the other change will not be applicable anymore.

With respect to the results of the critical pair analysis obtained for the different scenarios, in the single user scenario it is desirable to know which changes can be independently rejected or confirmed. This can be achieved by studying compound operations for sequential independence. The goal is to determine when compound operations are sequentially independent based on the parameters they have. As an example, an InsertFragment operation followed by an InsertAction operation into the fragment leads to a dependency. This means that if the InsertFragment operation is rejected, also the dependent InsertAction operation needs to be rejected.

To compute the sequential dependencies between compound changes, given two rules p1 and p2, critical pairs of p1 and $p2^{-1}$, and critical pairs of $p1^{-1}$ and p2 have to be determined or computed. The critical pairs obtained are then encoded by specifying conditions on the parameters of the operations and captured in the dependency matrix 600 of FIG. 6 for InsertAction, DeleteAction, MoveAction, and InsertFragment. Entry(F) and Exit(F) are used to denote the entry and exit nodes of a fragment which can be either a Decision or a Fork or Merge or Join node. For each combination of operations, there exist configurations of the parameters such that the two operations are sequentially dependent. For example, InsertAction (X1, A, B) and InsertFragment (F2, C, D) are sequentially dependent if C=X1 OR D=X1.

In the multi-user scenario, to compute the conflicts, given two rules p1 and p2, the critical pairs of p1 and p2 can be determined. Critical pairs obtained are then encoded by specifying conditions on the parameters of the two rules. This is illustrated in the conflict matrix 700 of FIG. 7 for the compound changes InsertAction, DeleteAction, MoveAction, and InsertFragment. Similar to the sequential dependencies, all of the change operations are potentially in conflict.

Figure 9:
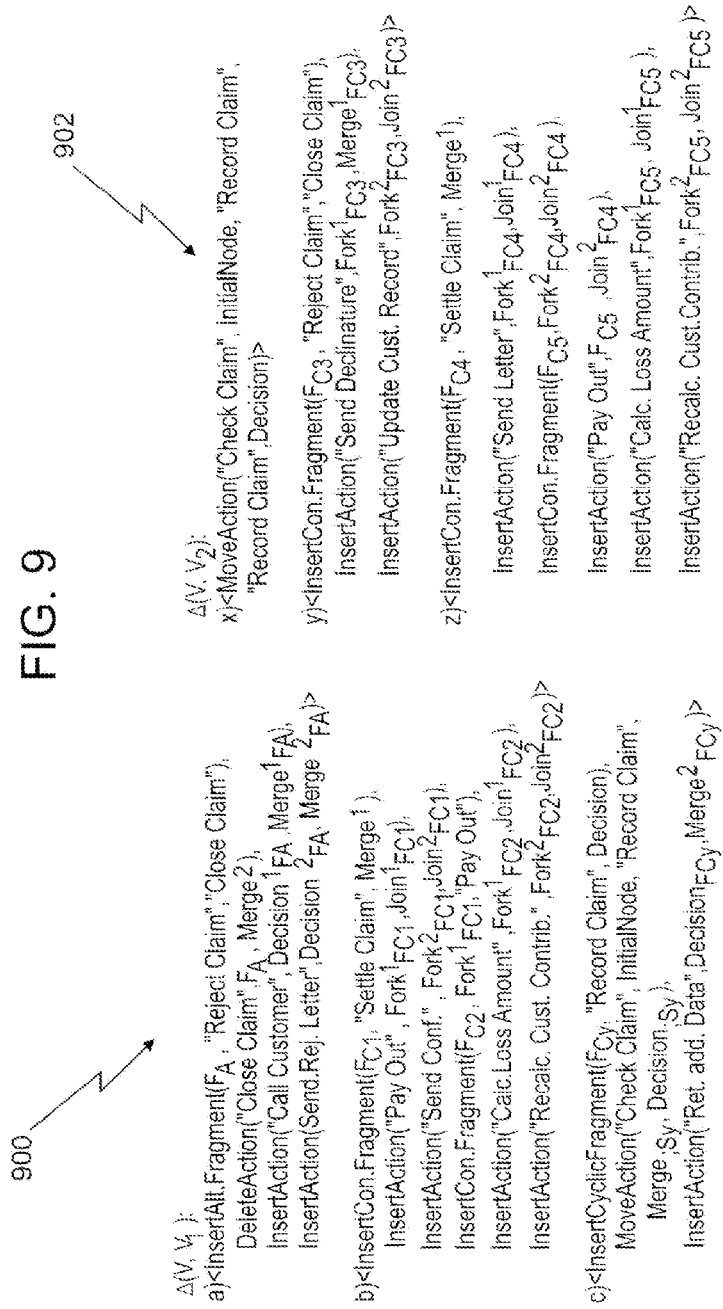
FIG. 9 illustrates subsequences for the various process models of FIG. 1.

Given a change sequence that transforms a model V 100 to a model V1 102, it is desirable to know dependencies between operations contained in the change sequence. These dependencies determine which parts of the change sequence can be performed in isolation of other operations in the change sequence. On the one hand, if all operations are independent, then the user can choose to execute any operation in any order. On the other hand, if no operation is independent, then the user has to execute the complete change sequence. The computation of parallel independent subsequences may be performed as follows. In a first step, a pair-wise comparison of change operations of the change sequence is performed in order to detect direct dependencies between change operations. This pair-wise comparison makes use of the dependency matrix 600 of FIG. 6. In a second step, transitive dependencies between change operations are computed. Computing transitive dependencies involves computation of connected components. In a third step, the original change sequence is broken up into subsequences such that operations in disjoint subsequences are independent and operations in the same subsequence are dependent. This third step is based on the previous two steps and divides the overall dependency graph into connected components. FIG. 9 illustrates subsequences $\Delta$ (V, V1) 900, $\Delta$ (V, V2) 902 for the example described previously. For each part 900, 902, three subsequences (a, b, c) (x, y, z) are determined or computed that are independent from each other. These parallel independent subsequences for change sequences are important for several reasons. First, they demonstrate which changes are dependent, which is important for the single user scenario. Second, for the multi-user scenario, the parallel independent subsequences are used for computing conflicts.

Given two change sequences S1 and S2, S1 transforming model V 100 into model V1 102 and S2 transforming model V 100 into model V2 104 such that both S1 and S2 comprise independent subsequences, it is desirable to know any conflicting change operations of S1 and S2. Informally, a conflict arises if the two operations cannot be applied in any order, yielding the same result. Thus, a conflict describes a situation where the application of one operation makes the application of the other operation impossible. Identifying conflicting change operations is desirable because the user has to make a decision as to which operation to apply.

In accordance with an embodiment of the invention, the determination or computation of conflicting operations is performed as follows. Iterate over all subsequence pairs (s1, s2) such that s1 is a subsequence contained in the change sequence S1 and s2 is a subsequence contained in the change sequence S2. For each such pair of subsequences, a pair-wise comparison of the change operations is performed and identified as to whether they are in conflict, making use of the conflict matrix 700 of FIG. 7. After resolving a specific conflict, new conflicts can occur. To identify these new conflicts, conflicts are recomputed after each conflict resolution.

Figure 10:
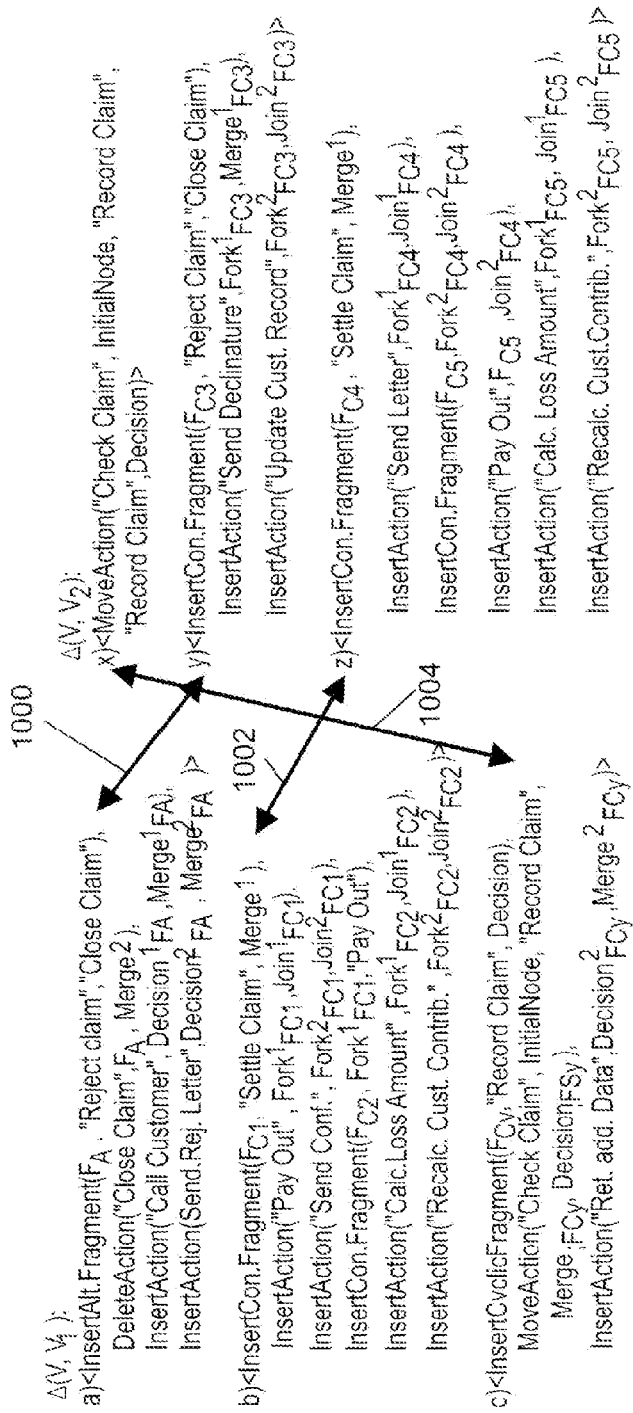
FIG. 10 illustrates the resulting conflicts from the two different change operations of FIG. 2 to the business process model of FIG. 1.

For the previously introduced example, the resulting conflicts are illustrated in FIG. 10. Three conflicts 1000-1004 have been determined or computed. The first conflict 1000 occurs between InsertAlt.Fragment ( . . . ) and Insert-Con.Fragment ( . . . ). The second conflict 1002 occurs between InsertCon.Fragment ( . . . ) and InsertCon.Fragment ( . . . ). The third conflict 1004 occurs between MoveActions. If a conflict has been found, it can be visualized to the user who is then responsible for resolving the conflict Conflict resolution involves a choice as to which change operation should be committed and can usually be performed with user input.

FIG. 11 illustrates an example of conflicts 1100 arising due to conflict resolution. Here, InsertCon.Fragment $(F_1, \ldots)$ and InsertCon.Fragment $(F_2, \ldots)$ are conflicting since both operations insert a fragment at the same position. In the event that this conflict is resolved by a unification (or by applying only subsequence $d_1$), a conflict arises between InsertAction (B, . . . ) and MoveAction $(T_j, \ldots)$ that is outside of $c_k$. This conflict can be determined or computed based on the results of critical pair analysis after the first conflict has been resolved. Resolving a conflict can also lead to a smaller number of conflicts if an operation together with its subsequence is rejected and its dependent operations also become non-applicable.

As mentioned, there are different options for conflict resolution. For the following discussion, assume that two change sequences Δ 1 and Δ 2 exist that have been divided into parallel independent subsequences as previously described. For a given conflict, conflict resolution can comprise (at least) the following choices: (1) selection of the subsequence to adopt, meaning that the complete other subsequence is discarded and not further considered; (2) change operation unification where the operations in conflict have a similar type or are structurally very similar. In such a case, the conflict can be resolved by performing one operation and establishing a mapping between the elements used; (3) performing a combination of the two operations. If the operations cannot be unified directly, i.e., one operation inserts a fragment with six branches, the other one with only two branches, then a common superset or subset can be chosen; and (4) both operations are performed by modifying one or both operations, leading, for example, to a sequential or parallel insertion of fragments or actions.

The choice of which type of conflict resolution to adopt is made by the user, usually based on the user's domain knowledge of the models, and cannot be automated. However, often some directions can be offered to the user. For example, a change operation unification is only possible if the operations are similar. In many cases, the decision about conflict resolution influences the change operations that are dependent on the conflicting operations. In the case of unification, the parameters of the dependent operations have to be recomputed by replacing the unified parameters of the conflicting operations. In the case of a combination, a new operation must be used and this also yields to recomputation of parameters. In the case that one of the two subsequences is adopted and the other one is discarded, it is desirable to know about possible conflicts that occur within the adopted subsequence. By adoption, all the operations inside the subsequence will also be adopted, meaning that in case of a conflict this type of conflict resolution will be chosen for contained operations as well. In the case that two conflicting changes are similar with respect to their type and their parameters, the conflict between them can be resolved by unifying the two changes. Thereby, two changes are treated like one change that was applied in both models.

In the example described hereinabove, a conflict which is likely to be resolved by a unification is the conflict 1200 between subsequence b) and z) shown in FIG. 12. After the unification of InsertCon.Fragment $(F_{C1}, \ldots)$ and InsertCon.Fragment $(F_{C4}, \ldots)$ the parameters and conflicts for the changes that are dependent on the unified changes are recomputed. In this case, $F_{C1}$ and $F_{C4}$ are unified as well as the nodes $Fork_{FC1}$ and $Fork_{FC4}$ and $Join_{FC1}$ and $Join_{FC4}$. This leads to two additional conflicts between InsertAction (Pay Out, . . . ) and InsertAction (Send Letter, . . . ) as well as InsertAction (Send Conf., . . . ) and InsertCon.Fragment $(F_{C5}, \ldots)$, because due to the unification the dependent changes are now applied in the same concurrent fragment and their parameters overlap.

In all cases, conflict resolution entails the application of one or both conflicting, possibly modified or adapted, change operations. After this, conflicts between the following operations are recomputed and displayed to the modeler, leading to an iterative resolution process.

Figure 13A:
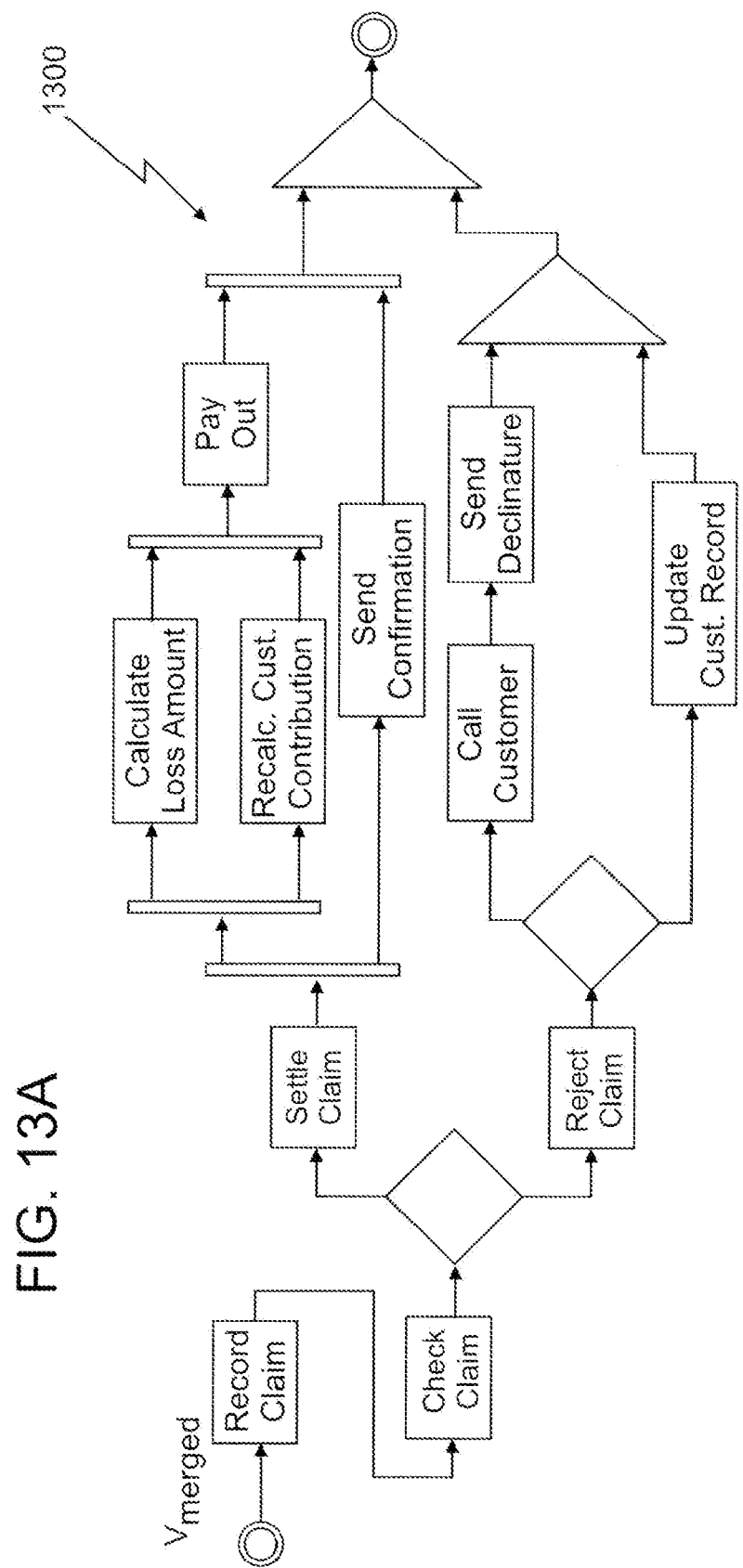
FIG. 13 illustrates the process of providing one possible resulting process model merged based on the modifications made to the changed models.
Figure 13B:
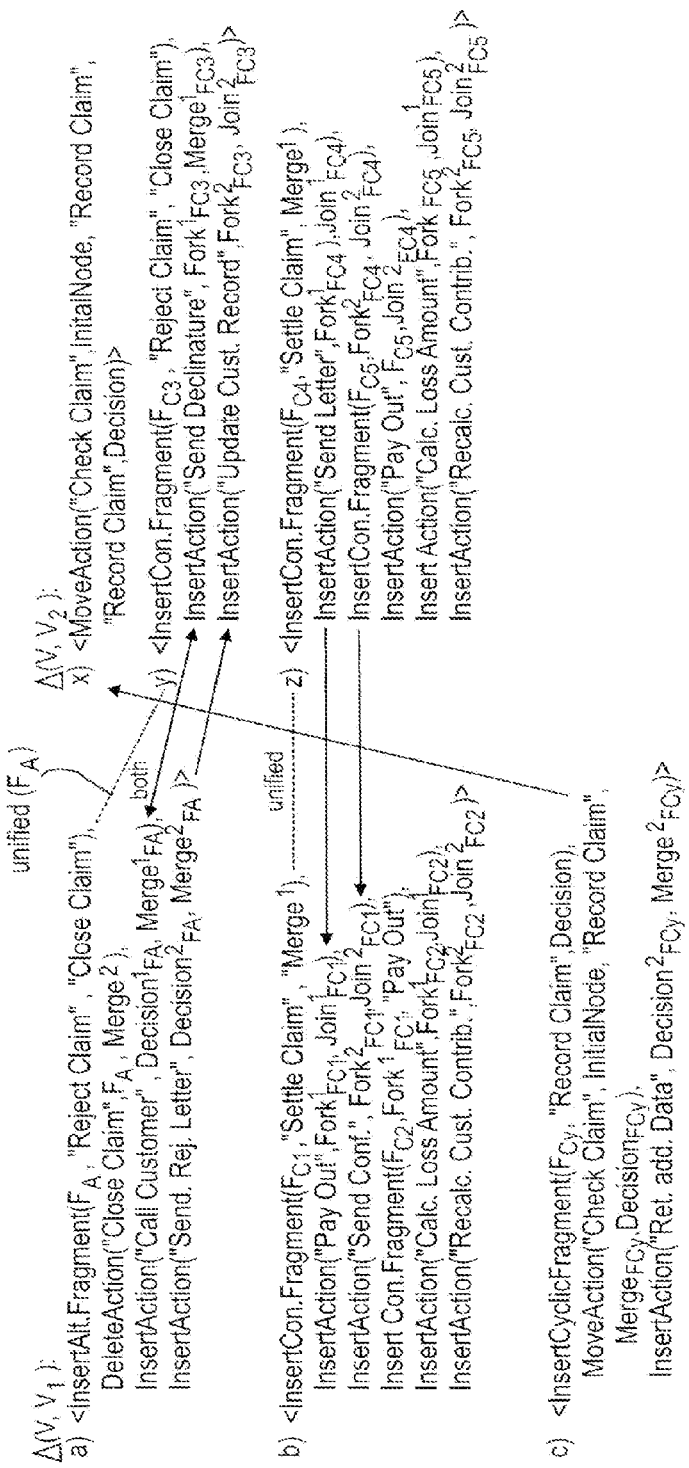

FIG. 13 illustrates the process 1300 of providing one possible resulting process model V 100 merged based on the modifications made in V1 102 and V2 104. Shown are both applied compound changes and rejected changes. The conflict resolution process starts by unifying the conflict between subsequence a) and y) and applied InsertAlt.Fragment $(F_4, \ldots)$ on model V 100. By the unification, all occurrences of $Fork_{FC3}$ and $Join_{FC3}$ in the signatures of the remaining operations are substituted by $Decision_{F4}$ and $Merge_{F4}$. Thereby, two new conflicts arise between the InsertAction operations in subsequence a) and y). In case of the conflict between InsertAction ("Call Customer", . . . ) and InsertAction ("Send Declinature", . . . ), both operations are selected for application, leading to a sequential insertion of the two actions. In the other case, apply InsertAction ("Update Cust. Record", . . . ) and reject InsertAction ("Send Rej. Letter", . . . ). Finally, apply DeleteAction ("Close Claim", . . . ). Further, resolve the conflict between b) and z) by unification as described previously and then apply only operations in b). For the resolution of the conflict between subsequence c) and x), adopt only subsequence x) and reject all operations contained in subsequence c). This example demonstrates that it is possible to resolve conflicts between change sequences in an iterative way with minimal manual intervention such that a consolidated process model is constructed.

The Process Structure Tree (PST) can be used for optimization of dependency determination or computation. Such a Process Structure Tree may be computed based on existing work and may also only be available for some parts of the process model. First, assuming n change operations in the change sequence, dependency computation will lead to a computational worst case complexity of at least $O(n^2)$, due to the pair-wise comparison of change operations. Further, an average case complexity of $O(n^2)$ is obtained. This complexity can be decreased by using the Process Structure Tree to localize the number of candidates with which one candidate has to be compared and the potential dependency has to be determined.

Figure 14A:
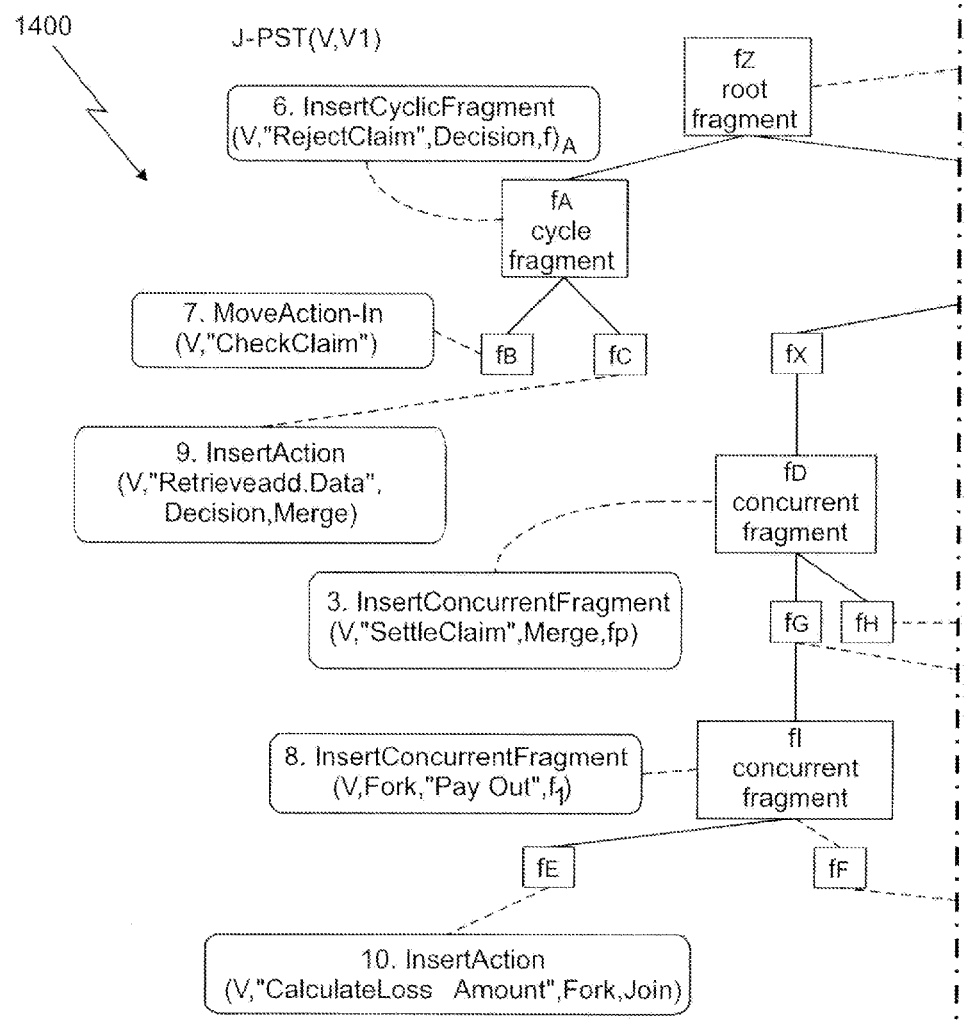
FIG. 14 illustrates the joint process structure tree with numbered operation annotations.

First, introduce the joint process structure tree (J-PST) 1400 with numbered operation annotations as illustrated in FIG. 14. The joint process structure tree 1400 contains both process structure trees where matching nodes have been identified. For example, both root fragments have been combined into one root fragment. The joint process structure tree 1400 can be constructed by first constructing each individual process structure tree and then combining nodes based on a given matching of process model elements that can be used to derive a matching of the process fragments. Matching fragments are then combined into one fragment in the joint process structure tree 1400.

In addition, the joint process structure tree 1400 is annotated with the change operations as illustrated in FIG. 14 and the execution order is captured in numbering them. With respect to the joint process structure tree being used for dependency computation optimization, the basic concept is to reduce the number of comparisons for a given operation op and use the Process Structure Tree to determine all possible operations with which op has to be compared for a potential dependency. However, it is to be noted that use of the joint process structure tree is optional.

Given an operation op in a fragment f, then op has to be compared with all other operations within the fragment f. Further, op has to be compared with operations that can be found when traversing the joint process structure tree 1400 towards the root. However, op does not have to be compared to operations that are contained in other fragments of the process structure tree, that are not on the way towards the root. For example, in FIG. 14, InsertAction (V, "Retrieve add. Data",-,-) in fragment $f_C$ does not have to be compared with operations in fragment $f_M$ because there cannot be a direct dependency between operations in disjoint fragments, which can be shown from the dependency matrix 600 of FIG. 6. This observation applies to all operations except to MoveAction and MoveFragment. These operations affect two fragments (in case of an inter-fragment move). As a consequence, each such inter-fragment Move-Operation is represented by explicit Move-In and Move-Out operations. The Move-In Operation is associated to the fragment into which the element/fragment is moved, while the Move-Out Operation is associated to the fragment out of which the element/fragment is moved. Note that in FIG. 14 the Move-Action is represented in this way.

Based on these observations, the following method determines or computes all direct dependencies:

Step 0: Start at the root, setting currentfragment:=root. Initialize the stack Stack. Push (currentfragment,{ }) onto the Stack.

Step 1: Pop (currentfragment, opparent(currentfragment)) from the Stack. If the Stack is empty, then terminate.

For the currentfragment, consider all operations (InsertAction, DeleteAction, MoveAction-In/Out, InsertFragment, DeleteFragment, MoveFragment-In/Out) directly contained in the current fragment. Denote these operations as op(currentfragment) and determine dependencies between these operations using the dependency approach described previously (i.e., the dependency matrix 600 of FIG. 6). Determine dependencies between all operations and opparent(currentfragment) as well. "Opparent(current fragment)" denotes all operations attached to the parent of the current fragment.

Step 2: Determine each directly contained fragment fin currentfragment and push (f, op(currentfragment)) onto the Stack.

Step 3: Goto Step 1.

The method traverses the joint process structure tree once and, at each fragment, computes dependencies between all operations associated to the fragment and the operations associated to the parent fragment (i.e., the reason for pushing these operations onto the stack as well).

The method traverses the joint process structure tree 1400 once and thereby has average case complexity for the traversal of O(k) where k is the number of fragments. In each Step 1, a dependency computation for all the operations contained at the tree node is performed. In the worst case, all change operations have occurred in one fragment. However, in the average case, change operations are distributed into different fragments, leading to a better complexity than $O(n^2)$.

Figure 15A:
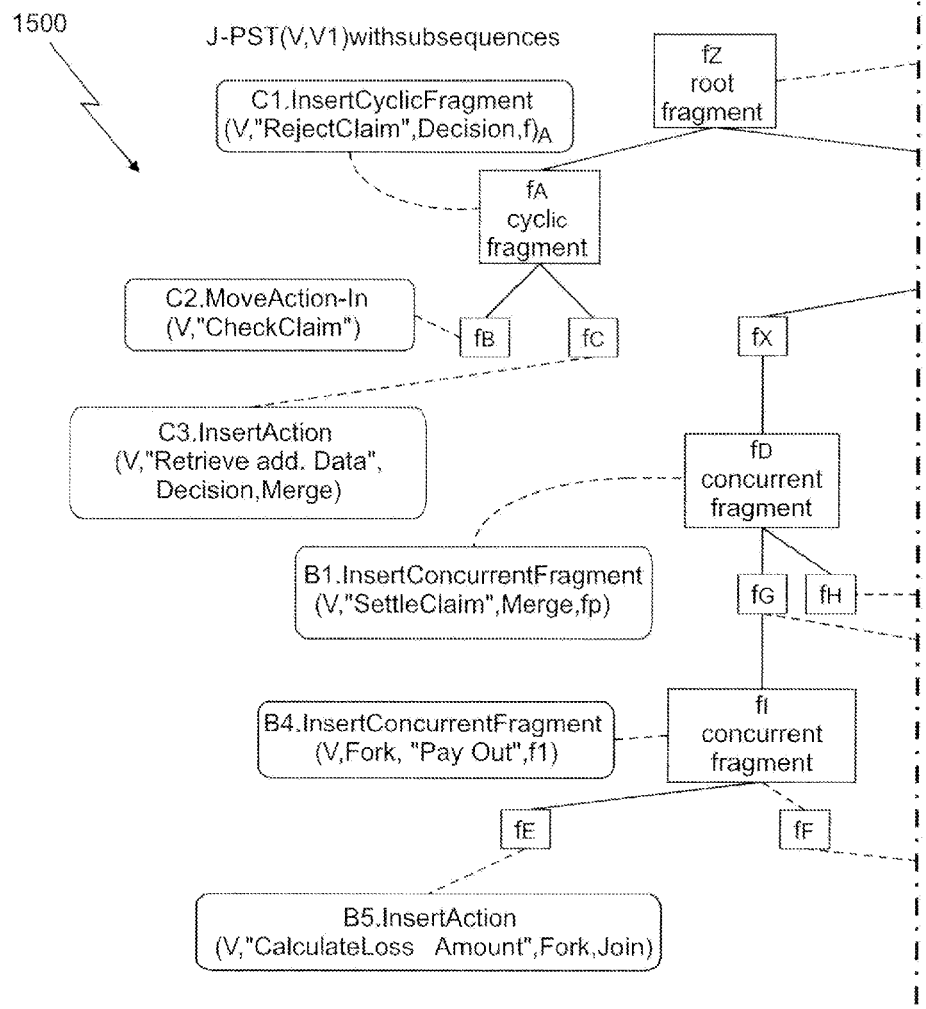
FIG. 15 illustrates the result of dividing a sequence into subsequences.

After the direct dependencies have been determined, transitive dependencies can be computed by determining connected components in the overall graph (e.g., by using a form of a depth-first search). Afterwards, the subsequence can be divided into subsequences as described hereinabove. The result 1500 is illustrated in FIG. 15. Here, three subsequences have been computed, visualized as <A1,A2,A3>, <B1, . . . , B6> and <C1, . . . , C3>.

Figure 16A:
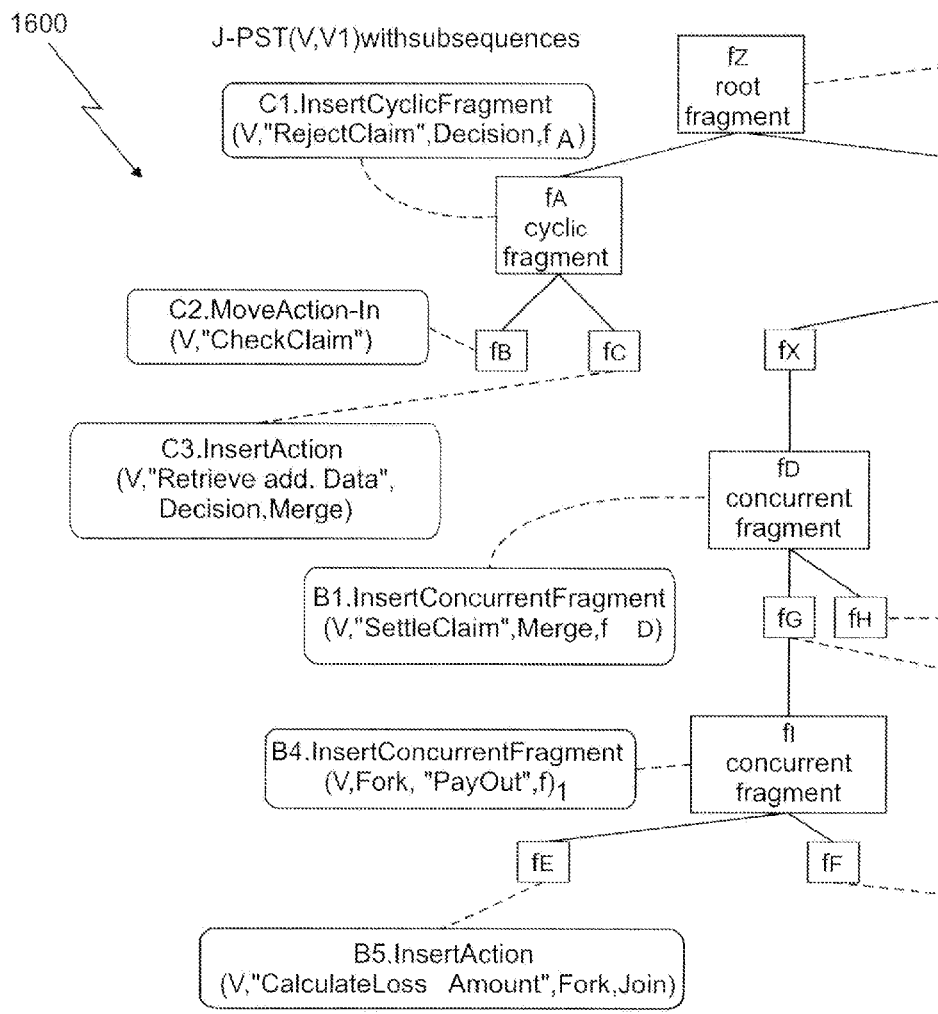
FIG. 16 illustrates joint process structure trees.
Figure 16D:
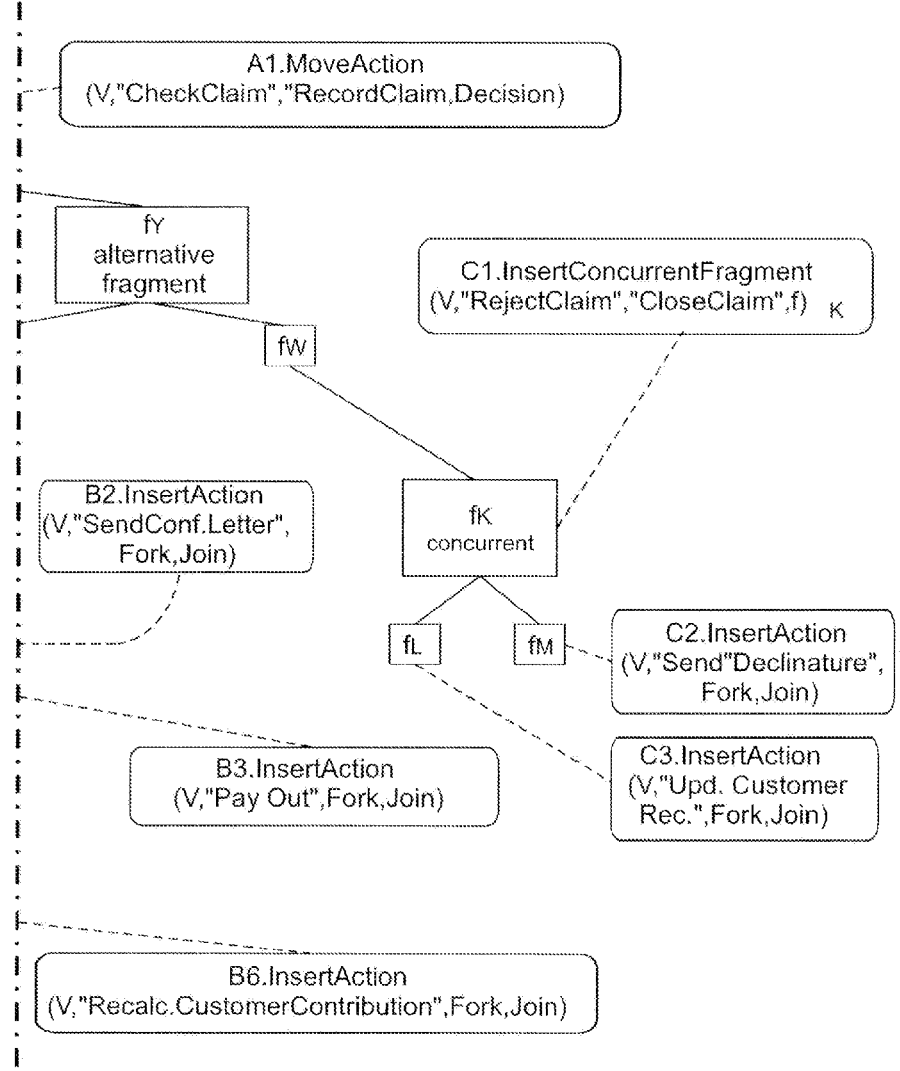

In a similar way as the dependency computation, the conflict computation of change operations can be improved using Process Structure Trees. Referring to the Joint PSTs 1600, 1602 of FIG. 16, as a first step compute two joint process structure trees 1600, 1602 as described previously by joining the PSTs of V 100 and V1 102 as well as V 100 and V2 104 (V1 102 has been created as one version of V 100 and V2 104 has been created as another version of V 100). In a second step, then compute for each joint PST 160, 1602 dependencies of the change operations as described previously. For the example introduced above, the joint PSTs 1600, 1602 are obtained as illustrated in FIG. 16.

The following method determines or computes all conflicts:

Step 0: Start at the root, setting currentfragment:=root. Initialize the stack Stack. Push (currentfragment, { }, { }) onto the Stack.

Step 1: Pop (currentfragment, opparent(currentfragment), 2ndopparent(currentfragment)) from the Stack. If the Stack is empty, then terminate.

For the currentfragment, determine the corresponding currentfragment in the second joint PST, denoted as 2ndcurrentfragment. If there is no such fragment, do nothing. Otherwise, compute conflicts between all the operations contained in the currentfragment and the 2ndcurrentfragment, where the operations are denoted as op(curentfragment) and op(2ndcurrentfragment). Further compute conflicts between op(currentfragment) and opparent (2ndcurrentfragment) and op(2ndcurrentfragment) and opparent(currentfragment).

Step 2: Determine each directly contained fragment f of the currentfragment. Push (f, op(currentfragment), op(2ndcurretnfragment)) onto the Stack.

Step 3: Goto Step 1.

Generally, method embodiments of the invention may be practiced with a computer, for example, a general-purpose computer, and the methods may be coded as sets of instructions on removable or hard media for use by the computer. FIG. 17 is a schematic block diagram of a computer suitable for practicing embodiments of the present invention. In FIG. 17, computer system 1700 has at least one microprocessor or central processing unit (CPU) 1705. CPU 1705 is interconnected via a system bus 1710 to a random access memory (RAM) 1715, a read-only memory (ROM) 1720, an input/output (I/O) adapter 1725 for a connecting a removable data and/or program storage device 1730 and a mass data and/or program storage device 1735, a user interface adapter 1740 for connecting a keyboard 1745 and a mouse 1750, a port adapter 1755 for connecting a data port 1760 and a display adapter 1765 for connecting a display device 1770.

ROM 1720 contains the basic operating system for computer system 1700. The operating system may alternatively reside in RAM 1715 or elsewhere as is known in the art.

Examples of removable data and/or program storage device 1730 include magnetic media such as floppy drives and tape drives and optical media such as CD ROM drives. Examples of mass data and/or program storage device 1735 include hard disk drives and non-volatile memory such as flash memory. In addition to keyboard 1745 and mouse 1750, other user input devices such as trackballs, writing tablets, pressure pads, microphones, light pens and position-sensing screen displays may be connected to user interface 1740. Examples of display devices include cathode-ray tubes (CRT) and liquid crystal displays (LCD).

A computer program with an appropriate application interface may be created by one of skill in the art and stored on the system or a data and/or program storage device to simplify the practicing of embodiments of the invention. In operation, information for, or the computer program created to run, embodiments of the present invention is loaded on the appropriate removable data and/or program storage device 1730, fed through data port 1760 or typed in using keyboard 1745.

In view of the above, the method embodiments may therefore take the form of computer or controller implemented processes and apparatus for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing embodiments of the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing embodiments of the invention. When implemented on a general-purpose microprocessor, the computer program code segments configure the microprocessor to create specific logic circuits. A technical effect of the executable instructions is to implement the method embodiments described above.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While embodiments to the invention have been described, it will be understood that those skilled in the art, both now and in the future, may make various improvements and enhancements which fall within the scope of the claims which follow. These claims should be construed to maintain the proper protection for the invention first described.

What is claimed is:

1. A method performed by a processor based on instructions of a memory accessed by the processor for determining changes to a consolidated process model stored in the memory, comprising:

specifying, by the processor, any change operations to the consolidated process model that includes control nodes having a decision node, a merge node, a fork node, a join node, an initial node, and a final node;

identifying, by the processor, process fragments in the consolidated process model, wherein the process fragments are an extension enabling representations of a decomposition of the consolidated process model and utilized to detect and specify the change operations, wherein the process fragments include an alternative fragment having the decision node and the merge node, a concurrent fragment having the fork node and the join node, and a complex fragment including a combination of the control nodes;

iteratively traversing, by the processor, a joint process structure tree by utilizing a dependency matrix and a conflict matrix for each process fragment to detect, specify, and optimize dependencies and conflicts between the change operations, wherein the joint process structure tree is constructed by constructing individual process structure trees and combining the control nodes based on a given matching of elements used to derive a matching of the extension fragments to reduce a number of the pair-wise comparison for a given one of a plurality of change operations, wherein the conflicts are determined from conflicting change sequences from specified change operations, wherein if any conflicting change sequences are determined then the conflicting change sequences are presented for resolution; and updating, by the processor, the consolidated process model based on the dependencies and the conflicts between the change operations identified by the traversing of the joint process tree and based on the resolution when conflicting change sequences are determined, wherein determining the conflicting change sequences from the specified change operations comprises:

iterating, by the processor, over all subsequence pairs for the change sequences such that, for each of the subsequence pairs performing a pair-wise comparison of the specified change operations and identifying whether or not the specified change operations are in conflict; and if the specified change operations are in conflict, then presenting, by the processor, the conflicting change sequences for resolution.

2. The method as claimed in claim 1 further comprising deriving, by the processor, the dependency matrix from the specified change operations to the consolidated process model.

3. The method of claim 1, further comprising logging, by the processor, any specified change operations in at least one change log.

4. The method of claim 1, wherein specifying any change operations to the consolidated process model comprises:
defining, by the processor, a metamodel for the process modeling language;
specifying, by the processor, each change operation over the metamodel as a transformation rule; and
for each change operation specifying, by the processor, parameters that determine an effect of the change operation on the consolidated process model.

5. The method of claim 1, wherein deriving the dependency matrix from the specified change operations to the consolidated process model comprises:
determining as the dependencies, by the processor, type-level dependencies between each of two of the specified change operations, wherein a result for each determined type-level dependency is a critical pair;
examining, by the processor, each of the critical pairs; and
expressing, by the processor, each type-level dependency between each of the critical pairs in terms of parameters of the specified change operations.

6. The method of claim 1, further comprising deriving, by the processor, the conflict matrix from the specified change operations to the consolidated process model.

7. The method of claim 6, wherein deriving the conflict matrix from the specified change operations to the consolidated process model comprises:
determining as the conflicts, by the processor, type-level conflicts between each of two of the specified change operations, wherein a result for each determined type-level conflict is a critical pair;
examining, by the processor, each of the critical pairs; and
expressing, by the processor, each type-level conflict between each of the critical pairs in terms of parameters of the specified change operations.

8. The method of claim 1, further comprising determining a plurality of critical pairs between the specified change operations.

9. The method of claim 1, further comprising deriving the dependency matrix for the specified change operations by specifying dependencies for each critical pair of a plurality of critical pairs in terms of operation parameters, the dependencies being captured by the dependency matrix.

10. The method of claim 1, further comprising deriving the conflict matrix for the specified change operations by specifying the conflicts for each critical pair of a plurality of critical pairs in terms of the operation parameters, the conflicts being captured by the conflict matrix.

11. The method of claim 1, further comprising resolving each of the conflicts to produce a corresponding resolved conflict of a plurality of resolved conflicts by selecting which operations of the specified change operations to commit in accordance with user input that identifies one of a plurality of conflict resolutions.

12. The method of claim 11, wherein the plurality of conflict resolutions comprises:
selection of subsequence;
unification of operations in conflict;
performing a combination of the operations in conflict; and
performing both of the operations in conflict.

13. The method of claim 1, wherein the consolidated process model executes in any order all of the specified change operations that correspond to independent subsequences.

14. The method of claim 1, wherein the consolidated process model executes selected operations in a sequence of the specified change operations if none of the selected operations are independent.

15. The method of claim 1, wherein iteratively traversing the joint process structure tree to identify the dependencies and the conflicts between the change operations includes:
computing the dependencies between a plurality of operations associated with a current fragment and a plurality of parent operations associated to a parent fragment of the current fragment using the dependency matrix.

* * * * *